United States Patent
Neighbor

(10) Patent No.: US 10,627,042 B2
(45) Date of Patent: Apr. 21, 2020

(54) TRIPOD FOUNDATION TRANSMISSION TOWER REINFORCEMENT

(71) Applicant: OSMOSE UTILITIES SERVICES, INC., Peachtree City, GA (US)

(72) Inventor: Kristopher Mark Neighbor, Peachtree City, GA (US)

(73) Assignee: OSMOSE UTILITES SERVICES, INC., Tyrone, GA (US)

( * ) Notice: Subject to any disclaimer, the term of this patent is extended or adjusted under 35 U.S.C. 154(b) by 62 days.

(21) Appl. No.: 15/994,379

(22) Filed: May 31, 2018

(65) Prior Publication Data

US 2018/0347745 A1 Dec. 6, 2018

Related U.S. Application Data

(60) Provisional application No. 62/512,944, filed on May 31, 2017, provisional application No. 62/513,072, filed on May 31, 2017.

(51) Int. Cl.

| | |
|---|---|
| *F16M 11/00* | (2006.01) |
| *F16M 11/24* | (2006.01) |
| *F16M 11/16* | (2006.01) |
| *H01Q 1/12* | (2006.01) |
| *F16M 11/22* | (2006.01) |
| *E04B 1/19* | (2006.01) |

(Continued)

(52) U.S. Cl.
CPC ......... *F16M 11/245* (2013.01); *E04B 1/1909* (2013.01); *E04H 12/2215* (2013.01); *F16M 11/16* (2013.01); *F16M 11/22* (2013.01); *H01Q 1/1207* (2013.01); *H01Q 1/1235* (2013.01); *E04B 2001/2406* (2013.01); *E04C 3/32* (2013.01); *E04C 3/36* (2013.01); *F16M 2200/021* (2013.01)

(58) Field of Classification Search
CPC ...... F16M 11/245; F16M 13/04; E02D 27/42; E02D 37/00
USPC ............. 248/163.1, 165, 166, 171, 434, 435
See application file for complete search history.

(56) References Cited

U.S. PATENT DOCUMENTS

| | | | |
|---|---|---|---|
| 1,107,197 A | 8/1914 | Irving | |
| 2,474,250 A | 6/1949 | Howard | |

(Continued)

FOREIGN PATENT DOCUMENTS

| | | |
|---|---|---|
| CA | 2823814 A1 | 2/2015 |

OTHER PUBLICATIONS

PCT/US2018/035453 International Search Report and Written Opinion dated Aug. 1, 2018.

*Primary Examiner* — Steven M Marsh
(74) *Attorney, Agent, or Firm* — Troutman Sanders LLP

(57) ABSTRACT

The disclosed technology includes a tripod reinforcement beam for reinforcing a tripod grillage of a transmission tower. The tripod reinforcement beam may include top and bottom faces that are substantially planar surfaces, a rear face disposed substantially perpendicularly between a rear edge of the top face and a rear edge of the bottom face, and a front face disposed between a front edge of the top face and a front edge of the bottom face. The rear face may include first and second substantially planar rear face portions and an angled rear face portion. The front face may be include first and second substantially planar front face portions that are oriented parallel to the first and second substantially planar rear face portions, respectively.

20 Claims, 11 Drawing Sheets

(51) Int. Cl.
   *E04H 12/22*   (2006.01)
   *E04C 3/36*    (2006.01)
   *E04C 3/32*    (2006.01)
   *E04B 1/24*    (2006.01)

(56) References Cited

U.S. PATENT DOCUMENTS

| | | |
|---|---|---|
| 4,413,455 A | 11/1983 | Jenkins |
| 4,712,762 A * | 12/1987 | Liedle ............... F16M 11/247 248/156 |
| 6,102,357 A * | 8/2000 | Papadatos .......... A47G 33/1226 248/516 |
| 7,207,533 B1 * | 4/2007 | Coleman ............... F16M 11/16 248/188.2 |
| 8,272,684 B2 * | 9/2012 | Obolewicz ............... A47C 3/18 297/16.2 |
| 9,303,940 B2 * | 4/2016 | Bonelli ................ F16M 11/14 |
| 9,417,508 B2 * | 8/2016 | Yang .................... F16M 11/041 |
| 10,385,534 B2 * | 8/2019 | Neighbor ............... E02D 37/00 |
| 2015/0075108 A1 | 3/2015 | Kensinger et al. |

* cited by examiner

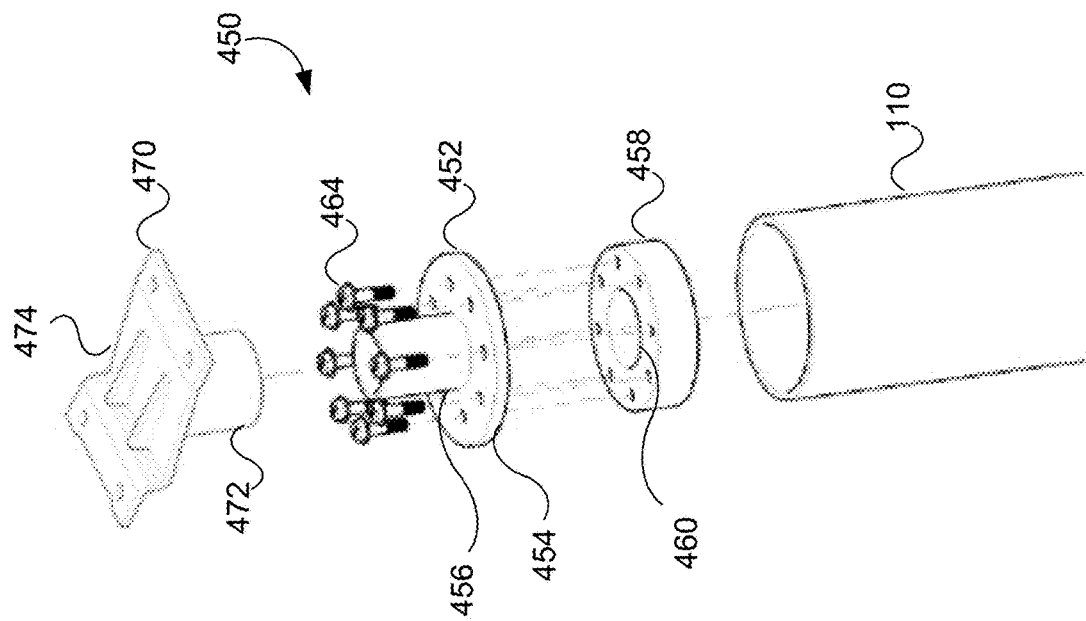
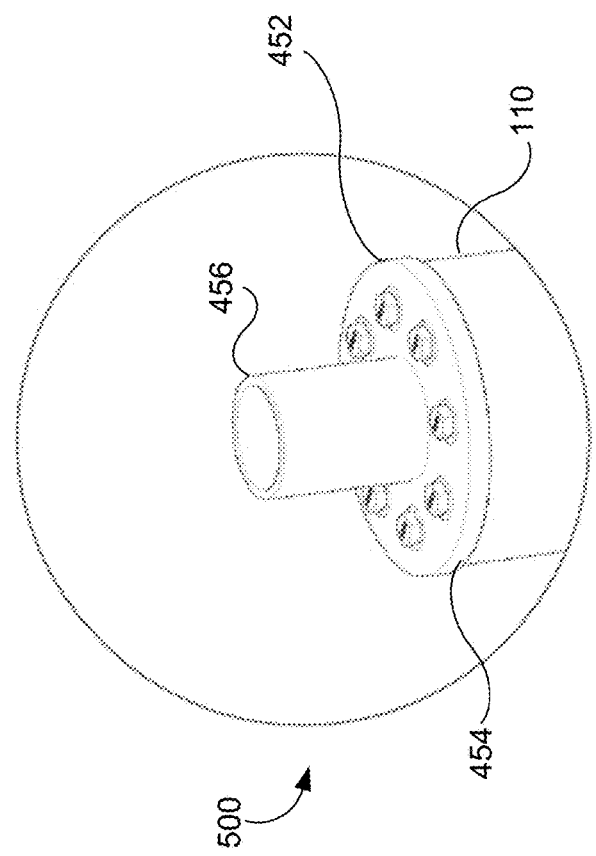
FIG. 5B
FIG. 5A

TRIPOD FOUNDATION TRANSMISSION TOWER REINFORCEMENT

CROSS-REFERENCE TO RELATED APPLICATION

This application claims the benefit of U.S. Provisional Application Nos. 62/512,944 and 62/513,072, each filed 31 May 2017, the entire contents and substance of which is hereby incorporated by reference.

BACKGROUND

Many electrical transmission utility companies utilize guyed lattice tower assets supported by a tripod support beam ("tripod" or "tripod beam") that bears on steel piles (e.g., helical piles), such as 3" small diameter steel pipe piles ("small piles") or 8" large diameter steel pipe piles ("large piles"). These towers are often located in remote wetlands or tidal areas that have fluctuations in the tidal water surface elevation that can lead to accelerated corrosion of the tripod support beam, as well as brackets and adapters positioned at the interfaces between the bottom of the tripod support beam and the top of the support piles. When the tower foundation is in a severe state of deterioration, traditionally a utility's best option is to replace the tower, which is costly and may cause significant environmental disruption to the environmentally sensitive areas in which many such towers may be located. The many challenges associated with replacement of such towers, such as environmental access, environmental preservation, critical service requirements, and budgetary issues can make tower replacement a very impractical solution. Therefore, a low impact, moderate cost solution that enables the repair of a transmission tower tripod support beam, bracket, and/or adapter without the need to replace the tower would provide significant economic and environmental benefits. Such repairs may be enabled by the boomerang tripod beam reinforcement repair and the two-piece adapter that are disclosed herein.

SUMMARY

Some or all of the above deficiencies may be addressed by certain embodiments of the disclosed technology. A tripod beam may be considered to have three "tripod zones," where each zone corresponds to the portion of the tripod beam located between two arms of the tripod. A boomerang reinforcement beam may be a steel reinforcing beam that is shaped to slide into the one of the tripod zones. In other words, it may be shaped to occupy the space formed between the upper surfaces of the bottom plates (i.e., bottom flanges) of a first and second adjacent tripod beam arms, and the lower surfaces of the top plates (i.e., top flanges) of the first and second adjacent tripod beam arms. Because each tripod zone is formed by two tripod beam arms that are positioned relative to one another such that a non-zero angle exists between them, the boomerang reinforcement beam may be a beam that has two members that intersect at the same non-zero angle as the angle that exists in a tripod zone. In some embodiments, the first and second adjacent tripod beam arms may form an angle that is approximately 120 degrees. Accordingly, in some embodiments, the boomerang reinforcement beam may be a beam that is bent in approximately the middle of the beam at an approximately 120-degree angle, giving it a boomerang-like shape. The boomerang reinforcement beam (which may also be referred to herein as a "boomerang") may include a plurality of apertures that are configured to securely receive bolts, screws, fasteners or other such securing members. The boomerang reinforcement beam may be fitted into one of the tripod zones and apertures may be drilled through the arm of the tripod beam to align with the apertures in the boomerang reinforcing beam. The boomerang reinforcement beam may be secured to the arm of the tripod beam by inserting bolts, screws, fasteners or the like through the apertures of the tripod arm and the boomerang reinforcement beam and securing the bolts, screws or fasteners to hold the boomerang reinforcement beam in position. In some embodiments, prior to securing the boomerang reinforcement beam to the arm of the tripod beam, the tripod beam may be coated with a corrosion mitigating protective coating. If more than one boomerang reinforcement beam is installed on a tripod beam, then the boomerang reinforcing beams may each be positioned in their respective tripod zone before being permanently attached to the tripod beam such that, for example, one or more bolts may secure two boomerang reinforcing beams to a single tripod beam arm (i.e., one boomerang reinforcement beam is secured to either side of the tripod beam arm). A boomerang reinforcing beams may be positioned and secured in each of the three tripod zones, thereby providing structural reinforcement to the tripod beam. In some embodiments, subsequent to multiple boomerang reinforcing beams being installed, a protective coasting or sealant may be applied on the seams and/or joints between the beams.

A pile adapter may typically be positioned between a steel pile and the tripod beam and acts to support a leg of the tripod beam such that the tripod beam is oriented approximately parallel to the ground. A two-piece pile adapter of the present disclosure may be used to replace a pile adapter that has degraded. The degraded pile adapter may be removed by first temporarily supporting the tripod beam using, for example, a screw jack, or some other device or methodology to transfer the tripod beam load to the pile below the degraded pile adapter. Once the load has been removed, the degraded pile adapter may be cut out or otherwise removed from the structure. A two-piece pile adapter may have a bottom piece for insertion into the pile and a top piece for holding the tripod arm. The top piece may be cut to a customized height in the field, so that the two-piece adapter can be appropriately sized to fill the gap between the tripod beam and the pile if, for example, corrosion has crept down into a top portion of the pile, requiring the replacement adapter to have more height. Because the two-piece pile adapter can be adjusted in height, it allows for replacement of the corroded pile adapter without having to raise the tripod beam. Further, because the top piece of the two-piece pile adapter is configured to rotate about a portion of the bottom piece, the bottom piece of the two-piece pile adapter can be positioned on the pile and the top piece can be rotated into position under the arm of the tripod beam without raising or displacing the tripod beam. When the top piece has been rotated into the proper position for repairing the structure, the top piece may be secured in place relative to the bottom piece by, for example, bolting, screwing, or fastening the pieces together. In some embodiments, one or more apertures may be drilled into a plate or bracket the extends out of the top piece of the two-piece pile adapter. Accordingly, when the top piece is rotated into position, the apertures of the plate may align with apertures in the bottom surface of the tripod arm, allowing the two-piece pile adapter to be secured to the bottom of the tripod arm.

According to an example embodiment, a tripod reinforcement beam is provided. A tripod reinforcement beam may include a top face that includes a substantially planar top surface. The tripod reinforcement beam may include a bottom face that includes a substantially planar bottom surface that is substantially parallel to the top face. The bottom face may be a shape substantially similar to the top face and may be aligned beneath the top face. The tripod reinforcement beam may include a rear face disposed substantially perpendicularly between a rear edge of the top face and a rear edge of the bottom face. The rear face may include a first substantially planar rear face portion, a second substantially planar rear face portion, and an angled rear face portion that may be disposed between the first substantially planar rear face portion and the second substantially planar rear face portion such that the first substantially planar rear face portion is oriented at an angle relative to the second substantially planar rear face portion. The tripod reinforcement beam may include a front face disposed between a front edge of the top face and a front edge of the bottom face. The front face may include a first substantially planar front face portion that is oriented parallel to the first substantially planar rear face portion and a second substantially planar front face portion that is oriented parallel to the second substantially planar rear face portion.

According to another example embodiment, a transmission tower base with a reinforced tripod is provided. The transmission tower base with a reinforced tripod may include a first, second, and third tripod arm each positioned to extend away from a central point such that each adjacent pair of tripod arms forms an approximately 120-degree angle. Each of the first, second and third tripod arms may respectively include a top plate, a bottom plate positioned in parallel to the top plate, and a tripod web including a substantially planar plate joining the top plate and the bottom plate at a substantially central axis of the top plate and the bottom plate. The tripod web may have a first side and a second side. The transmission tower base with a reinforced tripod may include an upper securing member positioned on top of the top plates of each of the first, second, and third tripod arms about the central point. The transmission tower base with a reinforced tripod may include an upper securing member positioned on top of the top plates of each of the first, second, and third tripod arms about the central point may include three lower support members. Each lower support member may be positioned beneath the bottom plate of a respective one of the first, second, and third tripod arms. The transmission tower base with a reinforced tripod may further include a first tripod reinforcement beam secured to the first tripod arm and the second tripod arm, a second tripod reinforcement beam secured to the first tripod arm and the third tripod arm, and a third tripod reinforcement beam secured to second tripod arm and the third tripod arm.

According to an example embodiment, a method of reinforcing a tripod with a tripod reinforcement beam is provided. The method may include determining locations for a plurality of apertures associated with a respective tripod web of a first, second and third tripod arm. The method may include creating the plurality of apertures at the respective determined locations in the tripod webs of the first, second and third tripod arms. The method may include placing a first tripod reinforcement beam into a first concave space formed by a first side of the first tripod arm and a first side of the second tripod arm such that apertures of a rear surface of the first tripod reinforcement beam align with apertures of the tripod webs of the first and second tripod arms. The method may include placing a second tripod reinforcement beam into a second concave space formed by a second side of the first tripod arm and a first side of the third tripod arm such that apertures of a rear surface of the second tripod reinforcement beam align with apertures of the tripod webs of the first and third tripod arms. The method may include placing a third tripod reinforcement beam into a third concave space formed by a second side of the second tripod arm and a second side of the third tripod arm such that apertures of a rear surface of the third tripod reinforcement beam align with apertures of the tripod webs of the second and third tripod arms. The method may further include securing the first tripod reinforcement beam to the first and second tripod arms, the second tripod reinforcement beam to the first and third tripod arms and the third tripod reinforcement beam to the second and third tripod arms.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 5A is a partial perspective view of a two-piece large pile adapter, according to an example implementation.

FIG. 5B is an exploded perspective view of a two-piece large pile adapter and pile bracket, according to an example implementation.

DETAILED DESCRIPTION

Figure 1:
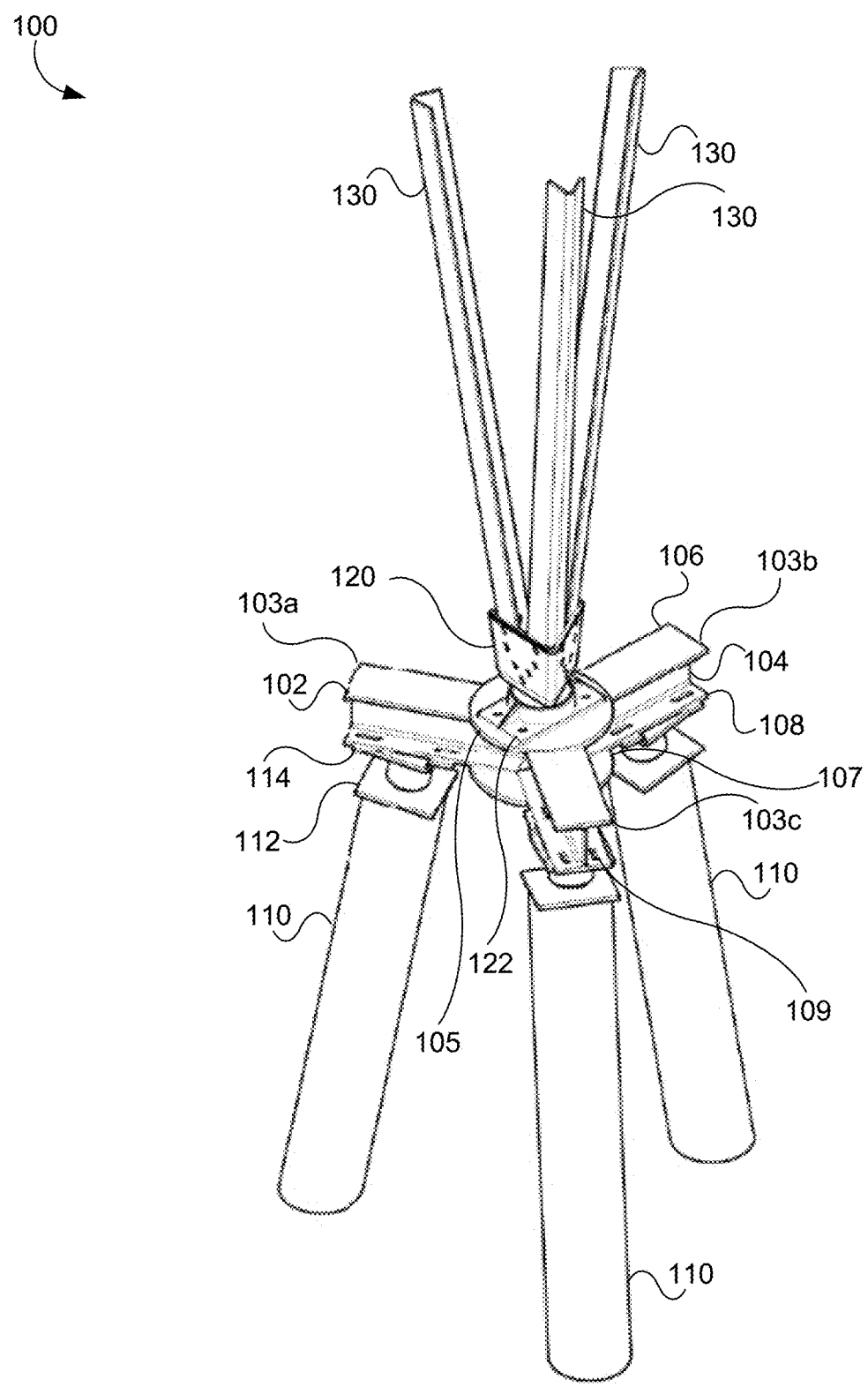
FIG. 1 is a perspective view of a transmission tower tripod and large pile configuration, according to an example implementation.

Embodiments of the disclosed technology include tripod reinforcement beams (also referred to herein as "boomerangs") and methods that can be used to reinforce a tripod beam of a transmission tower without the need to replace the transmission tower. Embodiments of the disclosed technology also include two-piece pile adapters, screw jack lifting beam assemblies and bearing platform assemblies that may be used to remove the load from a currently installed degraded pile adapter and allow for replacement of the pile adapter or other repairs to the pile. Further, although this disclosure is generally directed towards describing the repair or strengthening of a tripod beam of a transmission tower using a boomerang having an approximately 120-degree angle, it should be understood that the tripod reinforcement beam described herein may be used to repair a wide variety of other types of structures having beams with other angles and the shape of the tripod reinforcement beam described herein may be modified to suit such other structures. As will be appreciated by those of skill in the art, the angle of the tripod reinforcement beam and the number of tripod reinforcement beams needed to repair a "tripod" beam may vary based on the number of arms of the "tripod" beam and the angles of the arms relative to one another. For example, in some embodiments, a tripod reinforcement beam may have an approximately 90-degree angle to accommodate a "tripod" beam that has four arms instead of three. Additionally, while typical tripod structures have beams at approximately 120-degree angles to one another, it should be understood that the present invention may be adapted to structures on which the beams are positioned at different angles. In such structures, the angles may typically be in the range of 100 to 140 degrees between adjacent beams. The tripod reinforcement beams and two-piece pile adapters described herein may be used to quickly reinforce, strengthen, or repair portions of a transmission tower without the need to replace the tower itself, providing a fast and cost-effective means of extending the life of a transmission tower.

According to certain embodiments, tripod reinforcement beams may be secured to a transmission tower tripod beam to provide structural reinforcement and stability to the tripod. A typical transmission tower tripod beam will have three arms extending away from a center point, such that each arm is offset from each adjacent arm by an angle of 120 degrees, forming three "tripod zones" between each pair of arms. In some embodiments, each arm may be an I-beam, a W-beam or the like, that forms a concave space on two sides of a center vertical plate or web. A tripod reinforcement beam may be inserted into each tripod zone within the respective concave spaces formed by the arms and secured to the tripod beam to restore the original tripod beam design strength and design life of the transmission tower foundation. In some embodiments, a tripod reinforcement may also be paired with a replacement of a degraded pile adapter. In such cases, a modified screw jack lifting beam assembly may be configured to attach to a tripod beam that has had boomerangs installed. A bearing platform assembly may attach to the large pile and may work in conjunction with the modified screw jack lifting beam assembly to take the load off of a degraded pile adapter so that the degraded pile adapter may be removed and replaced with a two-piece pile adapter. In some embodiments, where the tripod has not been fit with boomerangs, a screw jack lifting beam assembly may be used to attach to the tripod in order to perform a replacement of the degraded pile adapter.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Various systems and methods are disclosed for reinforcing, repairing, strengthening, or hardening, a transmission tower tripod beam (herein referred to a "tripod") and/or replace a corroded pile adapter, and will now be described with reference to the accompanying figures.

As described herein, embodiments of the disclosed technology include boomerangs that may be used as tripod reinforcement beams to reinforce a tripod of a transmission tower. Transmission towers are commonly manufactured to have a tower base that includes a tripod that is supported by piles that are driven into the ground. For example, FIG. 1 shows a large pile configuration in which a transmission tower base 100 includes a tripod 102 having three tripod arms 103*a,b,c* that are supported by large piles 110. Each tripod arm 103 may include a top plate 106 (which may be alternately referred to as a top flange) that is connected to a bottom plate 108 (which may be referred alternately to as a bottom flange) by a tripod web 104. According to some embodiments, the top plate 106 and bottom plate 108 of a tripod arm 103 may be approximately the same shape and may be positioned in parallel to one another such that they are both joined by the tripod web 104 at an approximately perpendicular angle. According to some embodiments, the top plate 106 and bottom plate 106 of a tripod arm 103 may be rectangular-shaped plates and the tripod web 103 may be positioned at an axis that corresponds to a center line of the top plate 106 and/or bottom plate 108 that spans the length of the top/bottom plates 106, 108. According to some embodiments, the tripod arms 103*a,b,c* may be joined or welded together by one or more of an upper member 105 and a lower member 107, forming the tripod weldment, referred to herein as "tripod 102." For example, as shown in FIG. 1, each of the upper member 105 and lower member 107 may be a plate, such as a circular plate or other suitably shaped plate, that may be attached to a portion of each of the tripod arms 103a,b,c. According to some embodiments, the upper member 105 and/or lower member 107 may include one or more apertures configured to align with apertures in the top plate 106 and/or bottom plate 108 of a tripod arm 103 so that they may be attached to one another via bolts, screws, fasteners, or the like. According to some embodiments, the upper member 105 may have one or more apertures configured to align with apertures of the flower pot socket 122 to allow the flower pot socket 122 to be attached to the upper member 105. As shown in FIG. 1, the bottom plate 108 of a tripod arm 103 may include one or more bottom plate apertures 109. For example, according to some embodiments, a tripod arm 103 may include a pair of bottom plate apertures 109 on either side of the tripod web 104, that may be configured to align with four respective apertures 115 of a pile bracket 114 to allow attachment of the tripod arm 103 to the pile bracket 114 using securing members such as bolts, screws, fasteners or the like. In some embodiments, the tripod web 104 may be a substantially planar plate. The tripod 102 may traditionally be made of metal, such as steel, iron, aluminum, carbon steel, or any other suitable material.

According to some embodiments, a transmission tower base 100 may include pile adapters 112 and brackets 114 that are positioned between the tops of the large piles 110 and the bottoms of each tripod arm 103a,b,c. The pile adapters 112 and brackets 114 may serve to create a transition connection between the respective piles 110 and the tripod 102. During the original installation, the piles 110 may be positioned or field trimmed such that the brackets 114 may be positioned at an approximately equal height so that the tripod 102 may be positioned approximately parallel to the ground in order to provide a flat base to serve as support for the transmission tower. A pile adapter 112 may be connected to a bracket 114 that may be secured to the bottom of a tripod arm 103 by being bolted, screwed, welded, riveted, fastened, or otherwise secured together. For example, in some embodiments, a bracket 114 may be slipped onto a one-piece pile adapter 112 using a male-female connection. Transmission tower legs 130 may be received by a receiving member designed to securely receive and stabilize the transmission tower legs 130, such as a flower pot 120. The flower pot 120 may be positioned in and/or secured to a flower pot socket 122 that is positioned on top of the tripod 102. According to some embodiments, the flower pot socket 122 can be secured (e.g., bolted, screwed, etc.) to the top of the tripod 102. In some embodiments, the flower pot socket 122 may be made of aluminum or another suitable metal.

Figure 2:
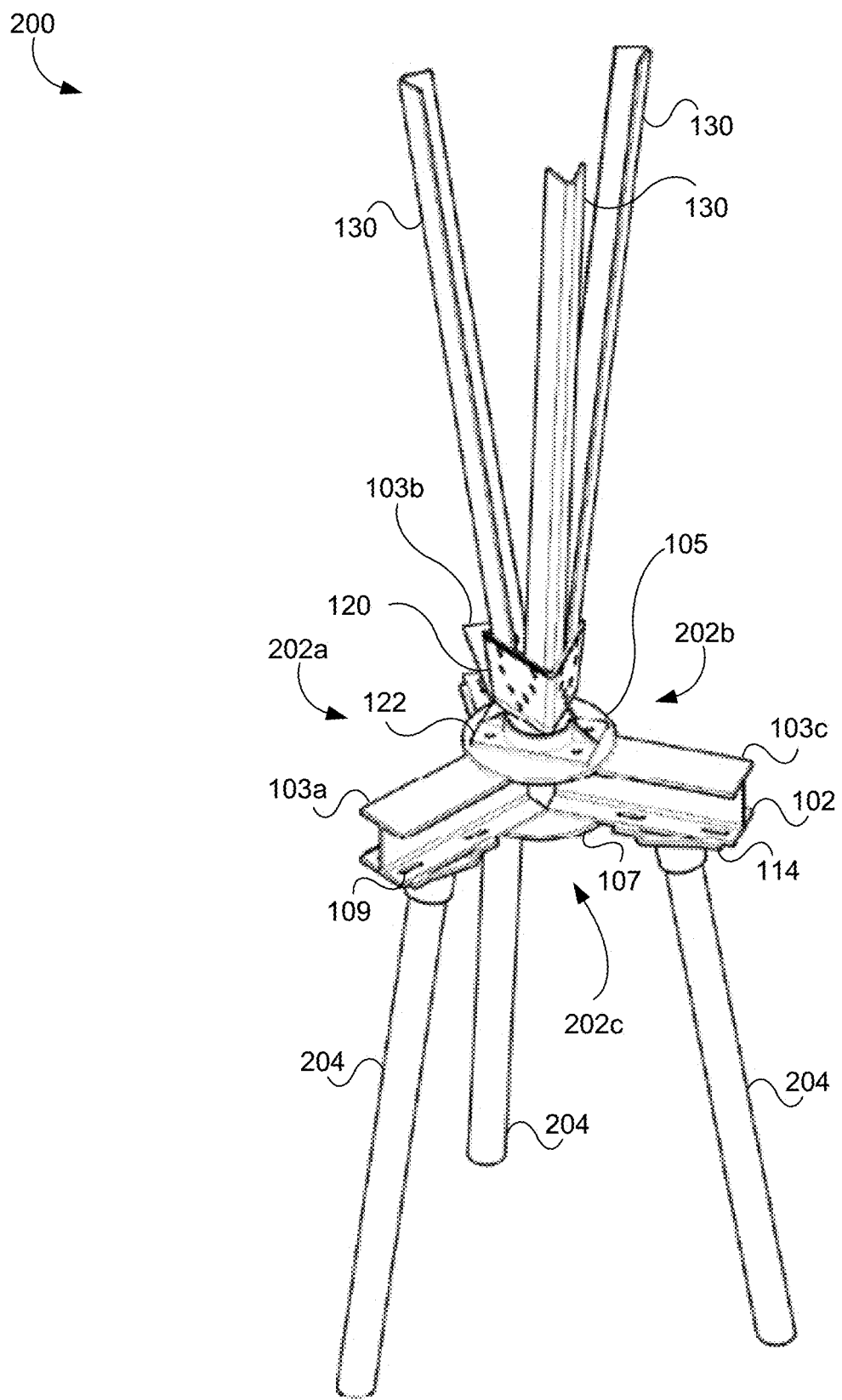
FIG. 2 is a perspective view of a transmission tower tripod and small pile configuration, according to an example implementation.

As shown in FIG. 2, some transmission towers 200 may have small pile configuration in which a transmission tower base 200 has a tripod 102 that is supported by small piles 204. Unlike the large piles 110, the small piles 204 may not support pile adapters 112, and thus the base of the tripod 102 may simply rest on brackets 114 positioned at the top of the small piles 204. According to some embodiments, the tops of the small piles 204 may be field trimmed to create a level plane to support the tripod 102. In the case of a small pile, if a bracket 114 must be replaced, the small pile 204 may be spliced to prevent the tripod 102 from having to be lifted or displaced. As can be seen in FIG. 2, each tripod arm 103a,b,c of the tripod 102 may extend outwards away from a center point proximate the flower pot socket 122, such that each arm is positioned at a 120-degree angle relative to each adjacent arm on each side. As shown, in some embodiments, each tripod arm 103a,b,c may be an I-beam, a W-beam, or the like. Accordingly, in some embodiments, the design of the tripod 102 may create three "tripod zones," which may be concave spaces between a first side of a first tripod arm 103 and a first side of an adjacent second tripod arm 103. A "side" of a tripod arm 103 may refer to one of the two vertical sides of the tripod web 104 of the tripod arm 103. For example, a first tripod zone 202a may exist between a first side of a first tripod arm 103a and a first side of a second tripod arm 103b, a second tripod zone 202b may exist between a second side of the second tripod arm 103b and a first side of a third tripod arm 103c, and a third tripod zone 202c may exist between a second side of the first tripod arm 103a and the second side of the third tripod arm 103c. In some embodiments, a "tripod zone" may refer to the space contained between the top plate 106 and bottom plate 108 on a first side of the tripod web 104 of a first tripod arm 103a as well as the corresponding space between the top plate 106 and bottom plate 108 of the side of the tripod web 104 of an adjacent tripod arm 103b that generally faces the first side of the tripod web 104 of the first tripod arm 103.

Figure 3A:
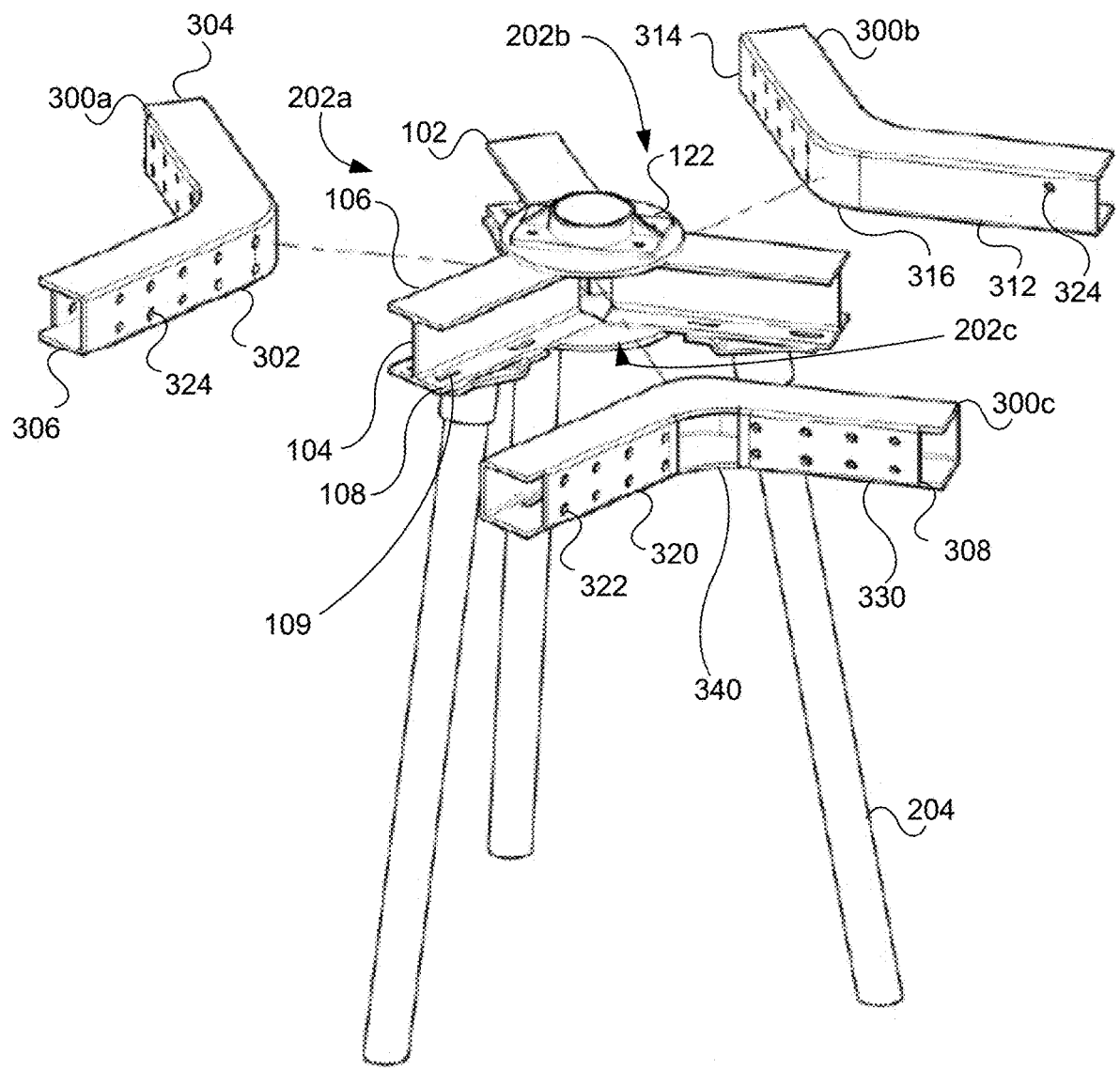
FIG. 3A is a partially exploded perspective view of a transmission tower tripod with boomerang reinforcements, according to an example implementation.
Figure 3B:
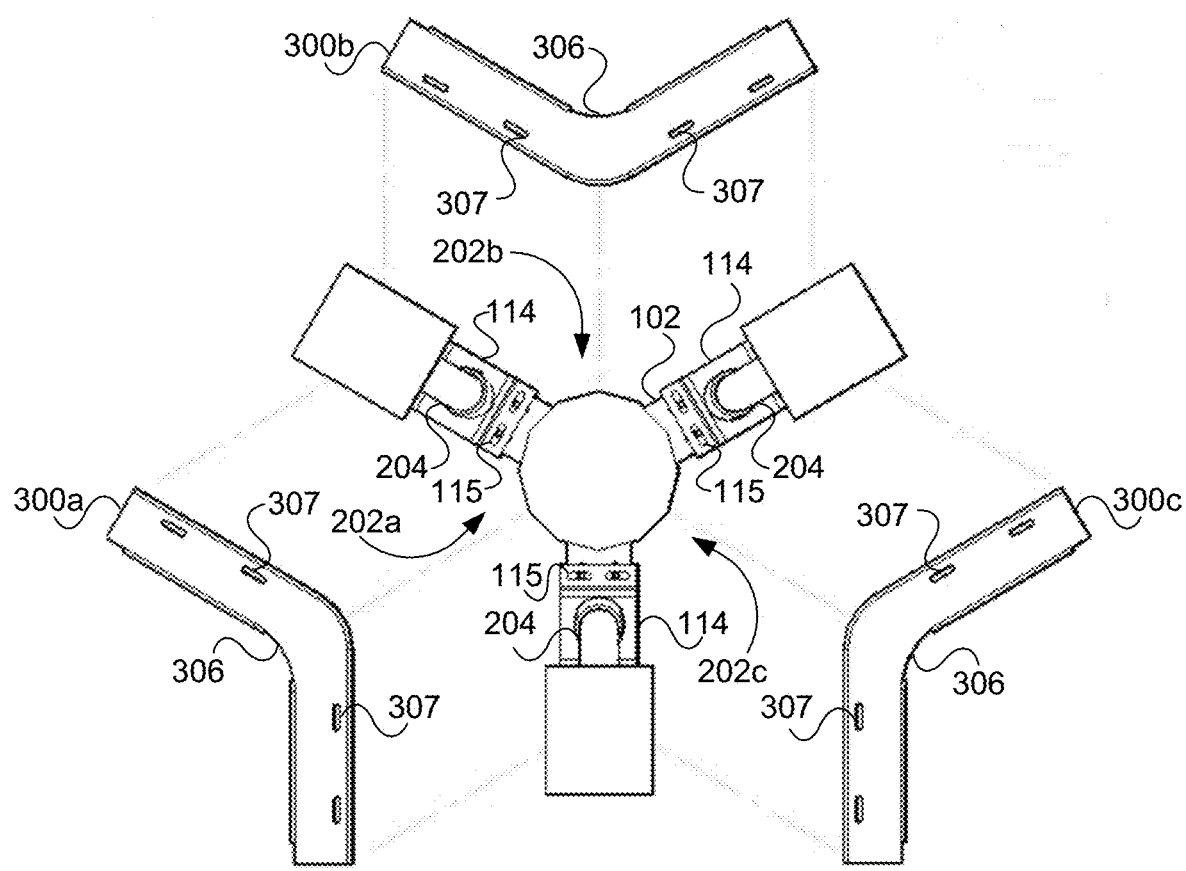
FIG. 3B is a partially exploded bottom view of a transmission tower tripod with boomerang reinforcements, according to an example implementation
Figure 3C:
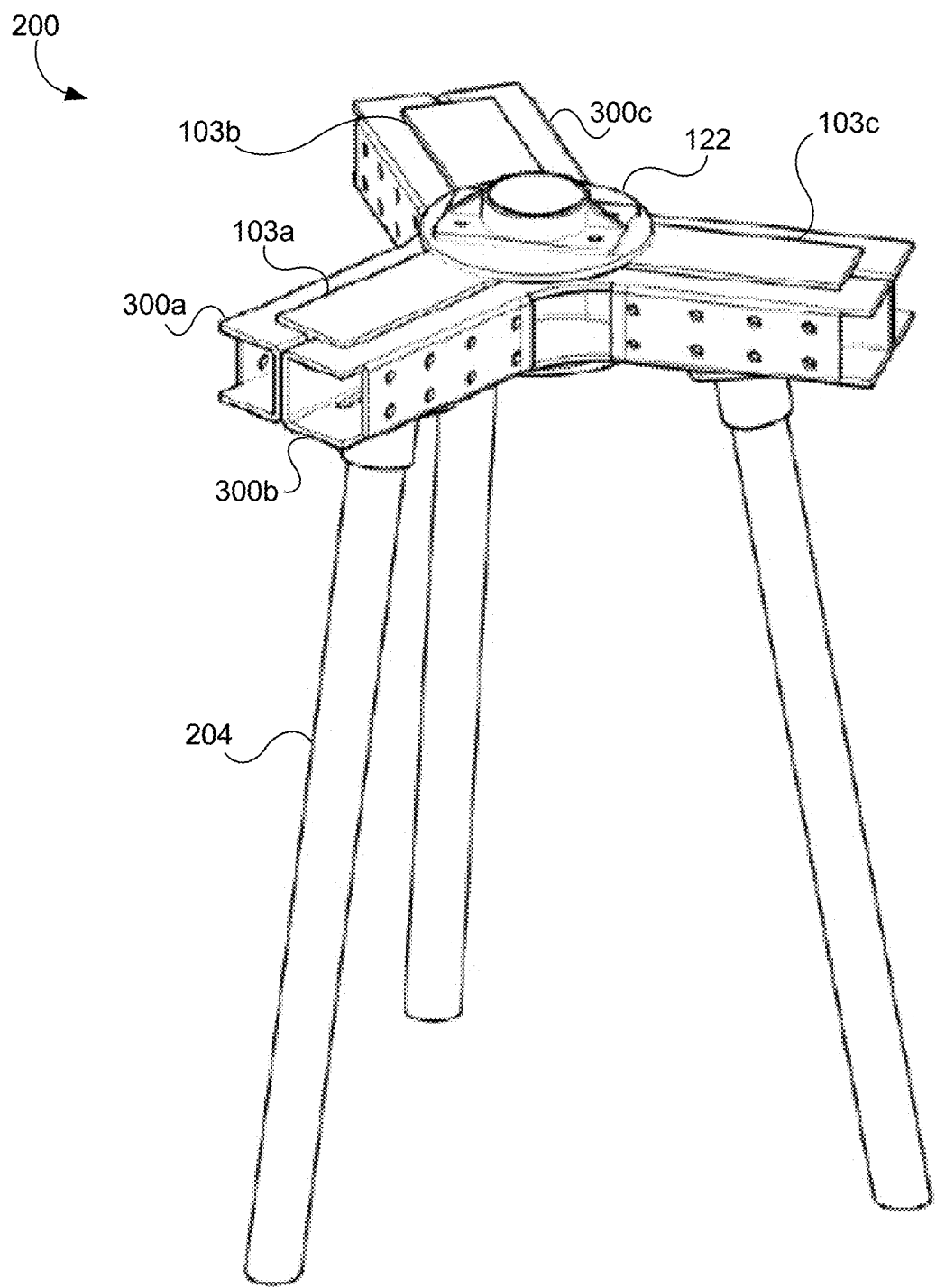
FIG. 3C is a perspective view of a transmission tower tripod with boomerang reinforcements, according to an example implementation.

For example, FIGS. 3A-3B show a partially exploded view of an embodiment of a first tripod reinforcement beam ("boomerang") 300a positioned to be placed in the first tripod zone 202a, a second boomerang 300b positioned to be placed in the second tripod zone 202b, and a third boomerang 300c positioned to be placed in the third tripod zone 202c. FIG. 3C shows an embodiment where the boomerangs 300 have been secured to the tripod 102 within the tripod zones to provide structural reinforcement to the tripod 102.

As shown in FIG. 3A, according to some embodiments, a boomerang 300 may comprise a body that is defined by a rear face 302, a top face 304, a bottom face 306 and a front face 308. As shown, boomerang 300 may be a beam that is configured to fit snuggly into a tripod zone formed by adjacent I-beam or W-beam shaped tripod arms 103. In some embodiments, boomerang 300 may have the general appearance of a rectangular tubular beam that has been bent at the middle to form a boomerang shape with squared ends. In some embodiments, a boomerang 300 may be fabricated into be a single continuous piece made of metal, such as steel or another suitable metal. In some embodiments, a boomerang 300 may be made of steel that is coated and/or hot dipped galvanized. According to some embodiments, the top face 304 may include a substantially planar top surface and the bottom face 306 may include a substantially planar bottom surface that is substantially parallel to the top face 306. The top face 304 and bottom face 306 may be substantially similar shapes. In some embodiments, the bottom face 306 may be aligned beneath the top face 304 such that, if viewed from directly above, the bottom face 306 would have substantially the same outer contours as the top face 304. In some embodiments, as shown in FIG. 3B, the bottom face 306 of a boomerang 300 may include one or more bottom apertures 307. The one or more bottom apertures 307 may be positioned to align with one or more bottom plate apertures 109 of one or more tripod arms 103. For example, in the embodiment shown in FIG. 3B, a first pair of bottom apertures 307 may be positioned to align with a first pair of bottom plate apertures 109 of a first tripod arm 103a and a second pair of bottom apertures 307 may be positioned to align with a second pair of bottom plate apertures 109 of a second tripod arm 103b to allow the bottom face 306 of the boomerang 300 to be securely attached to an upper surface of the respective bottom plates 108 of the first and second tripod arms 103a,b after the boomerang has been positioned in the first tripod zone 202a. The boomerang 300 may attach to the tripod arms 103 via the bottom apertures 307 with securing members such as bolts, screws, fasteners or the like. According to some embodiments, pile brackets 114 may also include apertures 115 that are positioned to align with the bottom plate apertures 109 of a respective tripod arm 103, thereby allowing a securing member to be inserted through the aligned apertures of the pile bracket 114, the bottom plate 108 of the tripod arm 103 and the bottom face 306 of the boomerang 300 to securely attach all three together. According to some embodiments, the one or more bottom apertures 307 of a boomerang 300 may be prefabricated to align with the bottom plate apertures 109 of one or more tripod arms 103. In some embodiments, the bottom plate apertures 109 of the boomerang 300 may be created as part of the boomerang installation process by placing the boomerang 300 into a tripod zone 202, marking points on the boomerang 300 that align with bottom plate apertures 109 of one or more tripod arms 103 of the tripod zone 202, removing the boomerang 300 from the tripod zone 202 and creating the holes at the marked points by drilling, cutting, punching, or the like.

According to some embodiments, the rear face 302 may be disposed substantially perpendicularly between a rear edge of the top face 304 and a rear edge of the bottom face 306. In some embodiments, the rear face 302 may include a first substantially planar rear face portion 312 and a second substantially planar rear face portion 314 that are oriented at an angle relative to one another. In some embodiments, the first substantially planar rear face portion 312 and the second substantially planar rear face portion 314 may be positioned such that there is a 120-degree angle between them. In some embodiments, the rear face 302 may include an angled rear face portion 316 that is disposed between the first substantially planar rear face portion 312 and the second substantially planar rear face portion 314. In some embodiments, the rear face 302 (i.e., the first substantially planar rear face portion 312, the second substantially planar rear face portion 314 and the angled rear face portion 316) may be one continuous plate. In some embodiments, each of the first substantially planar rear face portion 312 and the second substantially planar rear face portion 314 may each be a plate and the angled rear face portion 316 may be a void.

According to some embodiments, the front face 308 of the boomerang 300 may be disposed between a front edge of the top face 304 and a front edge of the bottom edge 306. In some embodiments, the front face 308 may include a first substantially planar front face portion 320 and a second substantially planar front face portion 330. The boomerang 300 may be configured such that the first substantially planar front face portion 320 is substantially parallel to the first substantially planar rear face portion 312 and the second substantially planar front face portion 330 may be substantially parallel to the second substantially planar rear face portion 314. In some embodiments, the first substantially planar front face portion 320 and the second substantially planar front face portion 330 may each be a plate that is separated from one another by an angled front face portion 340 that comprises a void. In some embodiments, the body of boomerang 300 may be hollow and the void at the angled front face portion 340 may provide access to an internal space of the boomerang 300. According to some embodiments, the angled front face portion 330 may provide a contiguous surface such that the first substantially planar front face portion 320, the angled front face portion 330 and the second substantially planar front face portion 330 are a single continuous surface, such as an outer surface of a plate.

According to some embodiments, one or more of the first and second substantially planar rear face portions 312, 314 may include one or more rear surface apertures 324. For example, as shown in FIG. 3A, in some embodiments, the second substantially planar rear face portion 314 may include two rows of five rear surface apertures 324. In some embodiments, the first substantially planar rear face portion 312 may include one or more rear surface apertures 324. For example, in some embodiments, the first substantially planar rear face portion 312 may only include one rear surface aperture 324 that may be used to create an alignment with a corresponding one of a plurality of rear surface apertures 324 of the second substantially planar rear face portion 314 of a second boomerang 300 positioned in an adjacent tripod zone 202. Following such an alignment, portions of the first substantially planar rear face portion 312 that align with the other rear surface apertures 324 of the second boomerang 300 may be marked for creation of new corresponding rear surface apertures 314 or may have new corresponding rear surface apertures 314 drilled, cut, or punched while in alignment with the second boomerang 300. Thus, according to some embodiments, a single (or a small number of) rear surface aperture 324 on a first side of the rear face 302 of each boomerang 300 may allow alignment with a second side of the rear face 302 of a neighboring boomerang 300 having multiple rear surface apertures 324 prior to the creation of new rear surface apertures 324 on the first side of the rear face 302 to ensure the resulting plurality of rear surface apertures 324 properly aligns with the pre-existing plurality of rear surface apertures 324 of the second side of the rear face 302 of the neighboring boomerang 300. Although the numbering and positioning of rear surface apertures 324 shown in FIG. 3A is merely exemplary and it is contemplated that any number of apertures and positions of apertures may be used. Furthermore, it is contemplated that one or more rear surface apertures 324 may be created in the rear face 302 of a boomerang 300 during the process of installing the boomerang 300 into the tripod 102 as described below. According to some embodiments, the number of rear surface apertures 324 in the first substantially planar rear face portion 312 may differ from the number of rear surface apertures in the second substantially planar rear face portion 314 prior to installation, whereas in some embodiments they may have the same number. In some embodiments, one or more rear surface apertures 324 of a first boomerang 300a may be configured to align with corresponding apertures in a tripod web 104 of a first tripod arm 103a, as well as one or more rear apertures 324 of a second tripod arm 103b. In other words, as shown in FIG. 3C, when the boomerangs 300 are installed in the tripod 102, a tripod web 104 may be sandwiched between the rear faces 302 of two boomerangs 300 and it is contemplated that one or more bolts, screws, fasteners or other securing members may attach the rear face 302 of the first boomerang 300a to the tripod web 104 and the rear face of the second boomerang 300b. According to some embodiments, when installed, each rear face 302 of a boomerang 300 may be connected to the rear faces 302 of the other two boomerangs 300 across two different tripod webs 104 in this manner. Furthermore, in some embodiments, a first aperture may be created in the tripod web 104 that is configured to align with a single rear surface aperture 324 of the first substantially planar rear face portion 312 of a first boomerang 300a and one of a plurality of rear surface apertures 324 of the second substantially planar rear face portion 314 of a second boomerang 300b. The first and second boomerangs 300a,b and the tripod web 104 may be attached via the aligned apertures, and once attached, a plurality of apertures may be created in both the tripod web 104 and the first substantially planar rear face portion 312 of a first boomerang 300*a* by, for example, inserting a drill, a punch or the like into the other rear surface apertures 324 of the second substantially planar rear face portion 314 of a second boomerang 300*b* into the tripod web 114 and into the first boomerang 300*a*. In this manner, the respective apertures of the respective boomerangs 300 and tripod webs 104 may be aligned and created so that all rear surface apertures 324 of a boomerang 300 align with the apertures of the adjacent boomerangs 300 when installed.

In some embodiments, one or more of the first and second substantially planar front face portions 320, 330 may include one or more front surface apertures 322. In some embodiments, one or more front surface apertures 322 may be positioned to align with corresponding rear surface apertures 324 to allow through punching of a tripod web 104 in order to determine the location of field drilled holes. In some embodiments, the one or more front surface apertures 322 may be positioned to allow for the attachment of a screw jack as described below.

According to some embodiments, the boomerang 300 may include one or more bottom apertures 307 in the bottom face 306 to enable attachment of the boomerang 300 to a bracket 114 and may include one or more apertures in the top face 304 to enable attachment of the boomerang 300 to the flower pot socket 122. In some embodiments, some or all such apertures may be created in the boomerang 300 during fabrication. In some embodiments, one or more apertures may be created in the boomerang 300 by technicians during the process of installing the boomerang 300 into the tripod zone of the tripod 102.

As previously described, FIG. 3C shows an example embodiment of a transmission tower base 200 having a tripod 102 that has been reinforced by three boomerangs 300. The reinforced tripod 102 may include a first tripod arm 103*a*, a second tripod arm 103*b*, and a third tripod arm 103*c* each positioned to extend away from a central point such that each adjacent pair of tripod arms forms an approximately 120-degree angle. As previously described above, each tripod arm 103 may have a top plate 106, a bottom plate 108, and a tripod web 104. The tripod web 104 may be a substantially planar plate that joins the top plate 106 and the bottom plate 108 at a substantially central axis of the top plate 106 and the bottom plate 108. The tripod web 104 may have a first side and a second side, where each side may face a different tripod zone 202. The transmission tower base 200 with a reinforced tripod 102 may include an upper securing member, such as a flower pot socket 122, that is positioned on top of the top plates 106 of each of the first, second, and third tripod arms 103*a,b,c* about the central point, as shown in FIG. 3C. In some embodiments the upper securing member may be secured to one or more of the boomerangs 300*a,b,c*. The transmission tower base 200 with a reinforced tripod 102 may include three lower support members positioned beneath the bottom plate 108 of a respective one of the first, second, and third tripod arms 103*a,b,c*. For example, in some embodiments, three lower support members may be small piles 204. Each small pile 204 may have a bracket on top that may be secured to a tripod arm 103. In some embodiments, three lower support members may be large piles 110 that each have a pile adapter 112 and bracket 114 that may be secured to a tripod arm 103. As shown in FIG. 3, a first boomerang 300*a* may be secured to the first tripod arm 103*a* and the second tripod arm 103*b*, a second boomerang 300*b* may be secured to the first tripod arm 103*a* and the third tripod arm 103*c*, and a third boomerang 300*c* may be secured to the second tripod arm 103*b* and the third tripod arm 103*c*.

According to some embodiments, a rear face 302 or surface of the first boomerang 300*a* may be secured to the first side of the tripod web 104 of the first tripod arm 103*a* and the first side of the tripod web 104 of the second tripod arm 103*b*. Further, the top face 304 or top surface of the first boomerang 300*a* may be secured to the top plate 106 of the first tripod arm 103*a* and the top plate 106 of the second tripod arm 103*b*. Further, the bottom face 306 or bottom surface of the first boomerang 300*a* may be secured to the bottom plate 108 of the first tripod arm 103*a* and the bottom plate 108 of the second tripod arm 103*b*. According to some embodiments, a boomerang 300 may be secured to various points of a tripod arm by a securing member, such as a bolt, a screw, a fastener, or any other such suitable method of securing two pieces of metal together. According to some embodiments, the other two boomerangs 300*b,c* may be similarly attached to the tripod 102 in the other two respective tripod zones.

According to some embodiments, a first portion of the first boomerang 300*a* may be bolted to the tripod web 104 of the first tripod arm 103*a* and a first portion of the of the second boomerang 300*b*. In other words, the first tripod arm 103*a* may be sandwiched between the first portion of the first boomerang 300*a* and the first portion of a second boomerang 300*b*. In some embodiments, a second portion of the first boomerang 300*a* may be bolted to the tripod web 104 of the second tripod arm 103*b* and a first portion of the third boomerang 300*c*. In some embodiments, a second portion of the second boomerang 300*b* may be bolted to the tripod web 104 of the third tripod arm 103*c* and a second portion of the third boomerang 300*c*. In this way, all three boomerangs 300*a,b,c* may be secured to the tripod 102 such that each tripod web 104 of each tripod arm 103*a,b,c* are connected to (e.g., via bolts, screws, fasteners or the like) and sandwiched between the two rear faces 302 of two boomerangs 300. As previously described above, the rear faces 302 of two boomerangs 300 may be secured to each other and a tripod web 104 by inserting bolts through rear surface apertures 324 of the two boomerangs 300, which are aligned with apertures in the tripod web 104. While not shown in FIG. 3A, it should be understood that a tripod web 104 may have apertures that align with rear apertures 324 of the two boomerangs. According to some embodiments, such tripod web 104 apertures may be created during a process of fitting the boomerangs 300 to the tripod 102.

Figure 4A:
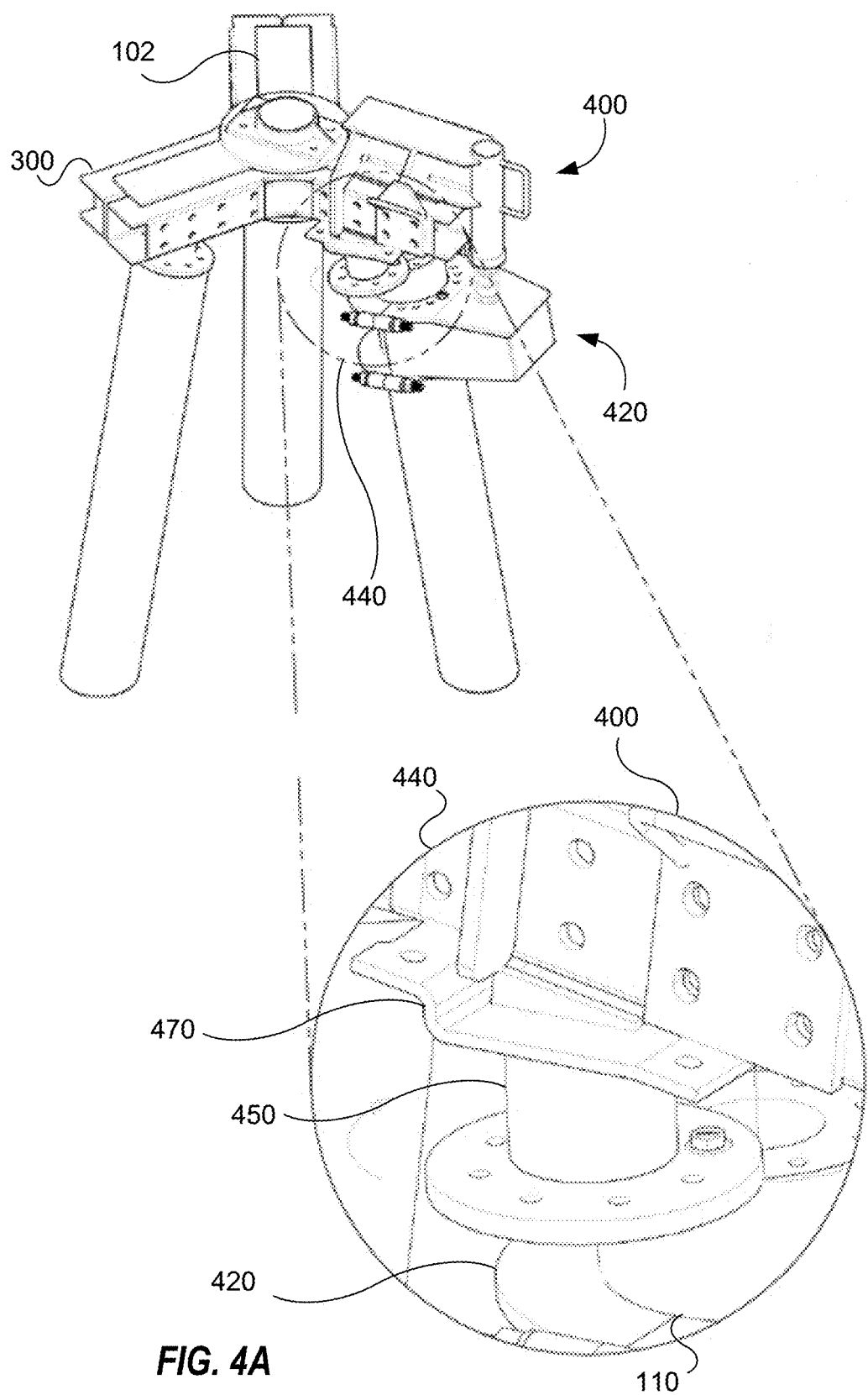
FIG. 4A is a perspective view of a transmission tower tripod and large pile configuration with inserted boomerang reinforcements having an attached modified screw jack lifting beam assembly and pile bearing platform assembly, according to an example implementation.

In addition to reinforcement of a tripod 102, embodiments of the present disclosure also allow for the replacement of a degraded pile adapter 112 and bracket 114 by attaching a screw jack lifting beam assembly and a pile bearing platform assembly to the tripod 102 and large pile 110, respectively, in order to create a load path that bypasses the degraded pile adapter 112 and bracket 114 and allow for their safe removal and/or replacement. FIG. 4A shows an embodiment of a transmission tower tripod 102 and large pile 110 configuration with inserted boomerang reinforcements 300 having an attached modified screw jack lifting beam assembly 400 and pile bearing platform assembly 420. The modified screw jack lifting beam assembly 400 may be capable of lifting and holding a loaded, reinforced tripod arm 103 of a boomerang-reinforced tripod 102. The modified screw jack lifting beam assembly 400 may provide a temporary load path to bypass the existing pile adapter and bracket. As shown in FIG. 4A, and more clearly shown in inset 440, the pile bearing platform assembly 420 may attach to the large pile 110 below the two-piece pile adapter 450 and a modified screw jack lifting beam assembly 400 may attach to a portion of the tripod 102 at the tripod arm 103 and boomerang 300. When installed on the pile 110, the pile bearing platform assembly 420 may provide a load bearing platform that may create a temporary load path to the existing large pile 110 from the modified screw jack lifting beam assembly 400. As will be appreciated by those of skill in the art, the attachment of the modified screw jack lifting beam assembly 400 and the pile bearing platform assembly 420 in the configuration shown may act to transfer the load of the transmission tower off of the two-piece pile adapter 450 and pile bracket 470 and onto the modified screw jack lifting beam assembly 400 and the pile bearing platform assembly 420 such that the two-piece pile adapter 450 may be safely removed. It should be understood that although FIG. 4A depicts an installed two-piece pile adapter 450, this disclosure contemplates the removal of a degraded pile adapter, which may be a conventional one-piece pile adapter, or a two-piece pile adapter 450 for replacement with a new two-piece pile adapter 450, or any other type of adapter and/or bracket combination that may be used to support an installed tripod 102 of a transmission tower.

Figure 4B:
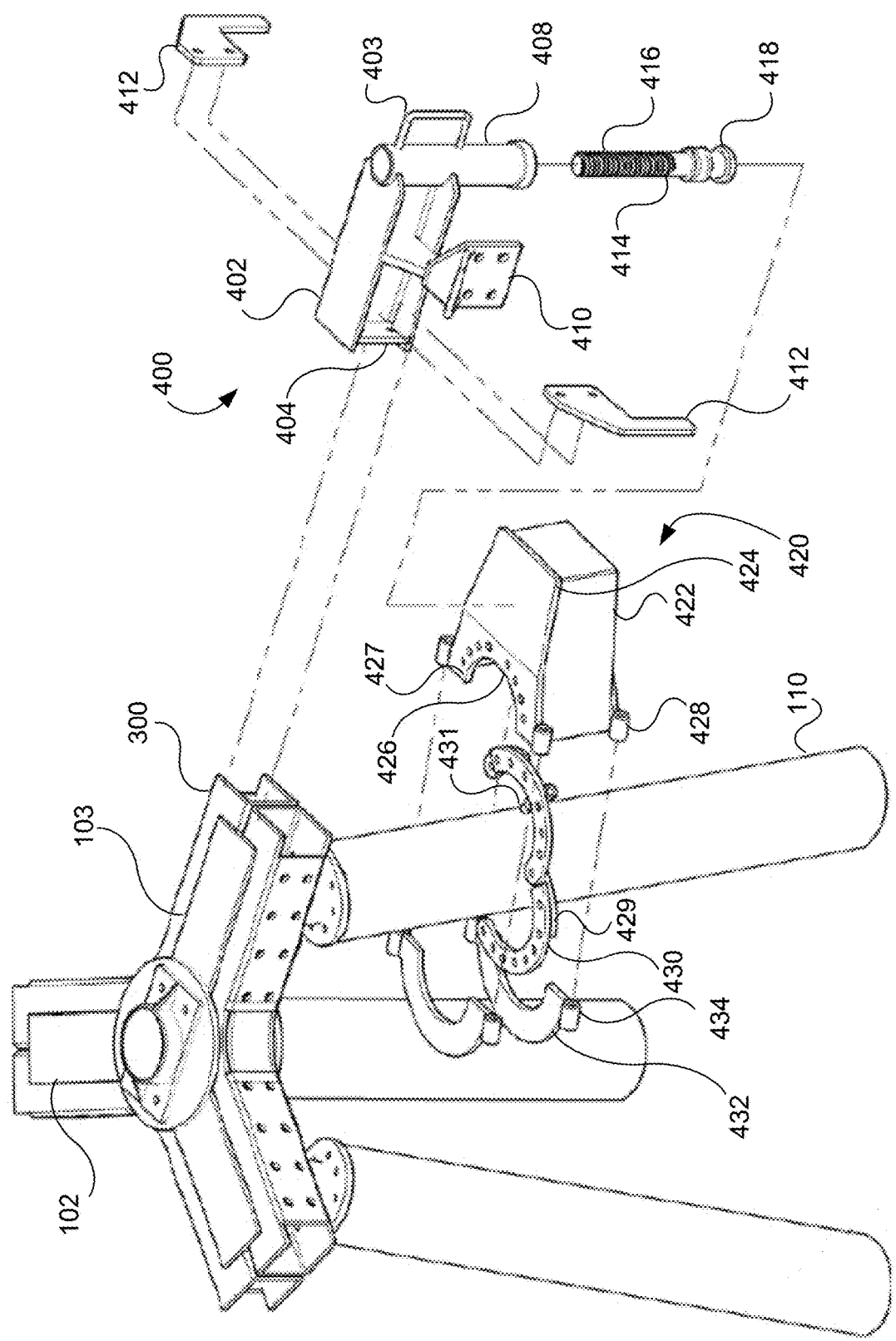
FIG. 4B is a partially exploded perspective view of a transmission tower tripod and large pile configuration having an attached modified screw jack lifting beam assembly and pile bearing platform assembly, according to an example implementation.

As shown in FIG. 4B, according to some embodiments, a pile bearing platform assembly 420 may include a pile bearing platform body 422 having a pile bearing platform top surface 424, a curved front face 426 that may be configured to fit snuggly around the perimeter of a large pile 110, and one or more bolt receiving members 428. The pile bearing platform assembly 420 may further include a shear engagement ring assembly 430 and one or more half-rings 432 having bolt receiving members 434 configured to align with the bolt receiving members 428 of the body 422. In some embodiments, the shear engagement ring assembly 430 may encircle a large pile 110 and a fixed shear pin 431 of the shear engagement ring assembly 430 may engage a hole (not shown in FIG. 4B) of the large pile 110. As shown in FIG. 4B, the shear engagement ring assembly 430 may include two approximately semi-circular rings having a plurality of apertures. Each of the semi-circular rings may be fitted around the pile 110 and may be connected together by, for example, attaching a plate 429 to either both ends of the semi-circular and securing them together via one or more securing members (e.g., bolts, screws, fasteners or the like) inserted through aligned apertures of the semi-circular rings and the plate 429. The inner diameter of the shear engagement ring assembly 430 may be configured to be slightly larger than the outer diameter of the large pile 110 to allow the shear engagement ring assembly 430 to be fitted around the large pile 110. The shear engagement ring assembly 430 may provide bearing and rotational restraint to the pile bearing platform body 422. According to some embodiments, the pile bearing platform body 422 may provide a cantilevered bearing surface off of the existing large pile 110 to support a screw cap assembly 418 of a modified screw jack lifting beam assembly 400. In some embodiments, the pile bearing platform body 422 may bear on the shear engagement ring assembly 430 and may be clamped to the large pile 110 with half-rings 432. In some embodiments, the pile bearing platform body 422 may be bolted to shear engagement ring assembly 430 such that they are interlocked to provide rotational restraint. For example, as shown in FIG. 4B, one or more apertures of the shear engagement ring assembly 430 may align with one or more apertures of a top surface of the pile bearing plate platform body 422 proximate to the curved front face 426 to allow them to be attached (e.g., via bolting, screwing, fastening or the like).

According to some embodiments, the half-rings 432 may be used with a threaded rod to clamp the pile bearing platform body 422 to the large pile 110. The half-rings 432 may transversely engage the large pile 110 to provide a transfer of forces, as well as a friction connection. In some embodiments, a friction connection may be created between the outer surface of the large pile 110 and the inner curved surfaces of the curved front face 426 (both upper and lower curvatures) and the corresponding half-rings 432. In some embodiments, the curvature of the curved front face 426 and the half-rings 432 may include one or more flat portions 427 that may serve to reduce the effective diameter of the connected pile bearing platform body 422 and half-rings 432 at the flat portions 427 such that the diameter may be less than the diameter of the large pile 110 at the flat portions 427 to allow the curved front face 426 and corresponding half-rings 432 to squeeze the pile 110 to provide a secure connection. According to some embodiments, the pile bearing platform assembly 420 may be securely attached to a large pile 110 by attaching the shear engagement ring assembly 430 to the large pile 110 and placing the half-rings and pile bearing platform body 422 on opposing sides of a large pile 110 such that the respective bolt receiving members 428, 434 align and may be bolted together. In this way, an attached pile bearing platform assembly 420 may provide a pile bearing platform top surface 424 that is positioned adjacent to, but is also supported by, the large pile 110.

In some embodiments, a modified screw jack lifting beam assembly 400 may include a screw jack body 402 having a handle 403 to assist with lifting the body 402, a front face 404, a threaded chamber 408 (e.g., an Acme threaded chamber), and a screw and cap assembly 414 configured to be height-adjustably received by the threaded chamber 408. According to some embodiments, the modified screw jack lifting beam assembly 400 may be configured to be positioned on top of the top plate 106 of a tripod arm 103 as shown in FIGS. 4A-B. In some embodiments, the modified screw jack lifting beam assembly 400 may be secured in place on top of a tripod arm 103 by attaching the modified screw jack lifting beam assembly 400 to a pair of boomerangs 300 installed on either side of the tripod arm 103 as described below. The screw jack body 402 may work in conjunction with the screw and cap assembly 414 to bypass the adapter and bracket with the load at the end of a given tripod arm 103. In some embodiments, screw jack body 402 may be bolted, screwed, fastened or otherwise secured to a boomerang 300 installed in a tripod arm 103 by inserting one or more securing members (e.g., bolts, screws, fasteners and the like) through one or more apertures of attachment plates 410 that align with corresponding front surface apertures 322 of the boomerang 300. The screw and cap assembly 414 may comprise a threaded rod 416 (e.g., an Acme threaded rod) on one end and a screw cap 418 on the opposing end. In some embodiments, the screw cap 418 may be a ball bearing swivel cap. In some embodiments, the screw and cap assembly 414 may be a premanufactured part. According to some embodiments, threaded chamber 408 may be configured to receive the threaded rod 416 of the screw and cap assembly 414 by rotating the threaded rod 416 into the threads of the threaded chamber 408. As will be appreciated by those of skill in the art, the relative height of the screw and cap assembly 414 may be adjusted vertically by screwing or unscrewing the threaded rod 416 from the threaded chamber 408. Accordingly, when the modified screw jack lifting beam assembly 400 has been attached to the tripod 102, the screw and cap assembly 414 may be unscrewed from the threaded chamber 408 to lower the screw cap 418 until it makes contact with the pile bearing platform top surface 424 such that the load of the tower is transferred from the tripod 102 into the modified screw jack lifting beam assembly 400, from the modified screw jack lifting beam assembly 400 into the pile bearing platform assembly 420 and from the pile bearing platform assembly 400 into the large pile 110. According to some embodiments, the modified screw jack lifting beam assembly 400 may include one or more attachment plates 410 that are positioned to roughly abut the front face 308 of a respective installed boomerang 308 as shown in FIG. 4A. The attachment plates 410 may include one or more apertures positioned to align with corresponding front surface apertures 322 of a respective installed boomerang 300 so that the modified screw jack lifting beam assembly 400 may be secured to the installed boomerangs 300 by, for example, attaching bolts, screws, or fasteners through the aligned apertures of the attachment plates 410 and the installed boomerangs 300. In some embodiments, the modified screw jack lifting beam assembly 400 may further include one or more removable stiffener brackets 412 that are configured to be bolted to the screw jack body 402 as shown in FIG. 4B to provide additional restraint to the screw jack body 402 when installed on a tripod arm 103. Once the modified screw jack lifting beam assembly 400 and the pile bearing platform assembly 420 are installed, the load may be removed from a decayed pile adapter 112 and/or bracket 114, and the pile adapter and bracket may be removed by, for example, cutting it out or otherwise detaching it so that a new, two-piece pile adapter 450 and bracket 470 may be installed.

FIG. 5A shows an embodiment of a two-piece pile adapter 500 installed in a large pile 110 and FIG. 5B shows an exploded view of an embodiment of the two-piece pile adapter 500 along with a bracket 470. As shown by FIGS. 5A-B, the two-piece pile adapter 500 may include an upper body of the adapter assembly 452 (which may be referred to as a "top hat") and a pile insert 458. According to some embodiments, the top hat 452 may include a substantially planar plate 454 having a diameter or perimeter that is larger than the outside diameter of large pile 110 and having a plurality of apertures for receiving securing members 464 (e.g., bolts, screws, fasteners (such as a threaded rod) or the like) and a receiving member 456 configured to receive and/or attach to the pile bracket 470. According to some embodiments, receiving member 456 may be a round tube or pipe that may be field trimmed on top to have an appropriate height for installation. The pile bracket 470 may include an upper surface 474 with gusset stiffeners to support the tripod 102. The pile bracket 470 may include a bent plate to ensure adequate edge distance for standard bolt holes to matched and field drilled in the correct locations. The plate of the pile bracket 470 may include a notch to provide clearance at the existing tripod centerplate connection. When installed in a transmission tower foundation, the pile bracket 470 may provide a load path from a tripod arm 103 of the tripod 102 to a large pile adapter or to a pile. In some embodiments, the receiving member 456 may be a cylinder configured to mate with a connection member 472 of the pile bracket 470. In some embodiments, the pile adapter insert 458 may be a ring configured to snuggly fit inside the interior of a large pile 110. The pile adapter insert 458 may have a plurality of apertures configured to align with the plurality of apertures in the base of the top hat 454 such that the two may be bolted, screwed, or fastened together. In some embodiments, each of the plurality of apertures of pile insert 458 may be a threaded hole configured to receive bolts, screws, fasteners or the like. When installed, pile adapter insert 458 may prevent translation of top hat 452 relative to the pile. According to some embodiments, the two-piece pile adapter 450 may be installed in a large pile 110 by first attaching the top hat 452 to the pile adapter insert 458 by inserting one securing member 464 through an aperture of both the top hat 452 and the pile adapter insert 458 such that the top hat 452 may rotate relative to the pile insert 458 about the one securing member 464. The two-piece pile adapter 450 may provide a load path from the pile bracket 470 to the large pile 110. Next, the pile adapter insert 458 may be placed into the interior of a large pile 110 and the top hat 452 with bracket 470 installed may be rotated beneath the tripod arm 103, as shown in the inset 440 of FIG. 4A. If necessary, the edge of the pile bracket 470 may be trimmed to allow the pile bracket 470 to fit snuggly beneath the tripod arm 103. Once in position, the remaining securing members 464 may be inserted through the remaining apertures of the top hat 452 and pile adapter insert 458 to secure the two-piece pile adapter 450 in place.

Figure 6A:
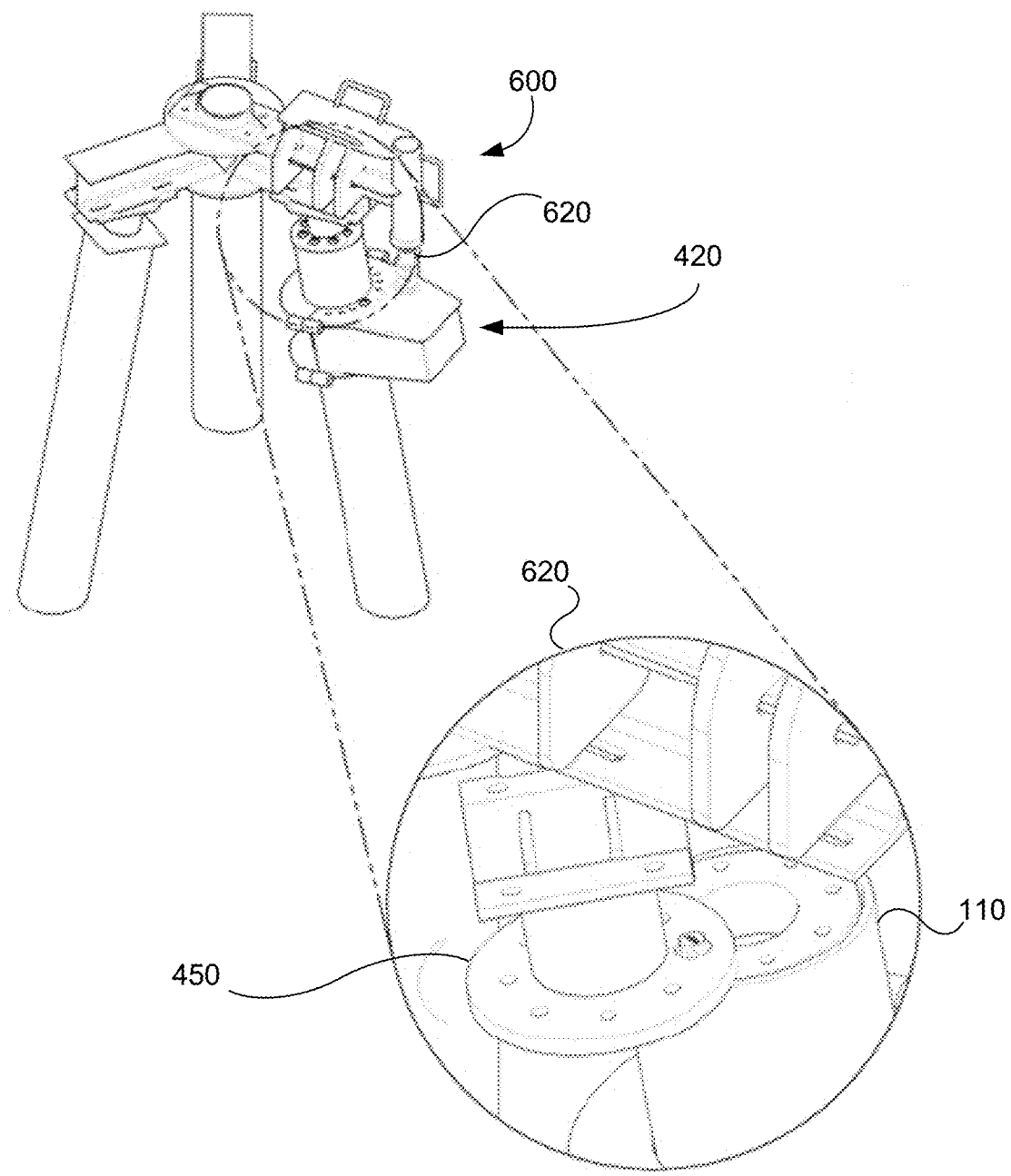
FIG. 6A is a perspective view of a transmission tower tripod and large pile configuration having an attached screw jack lifting beam assembly and pile bearing platform assembly, according to an example implementation.
Figure 6B:
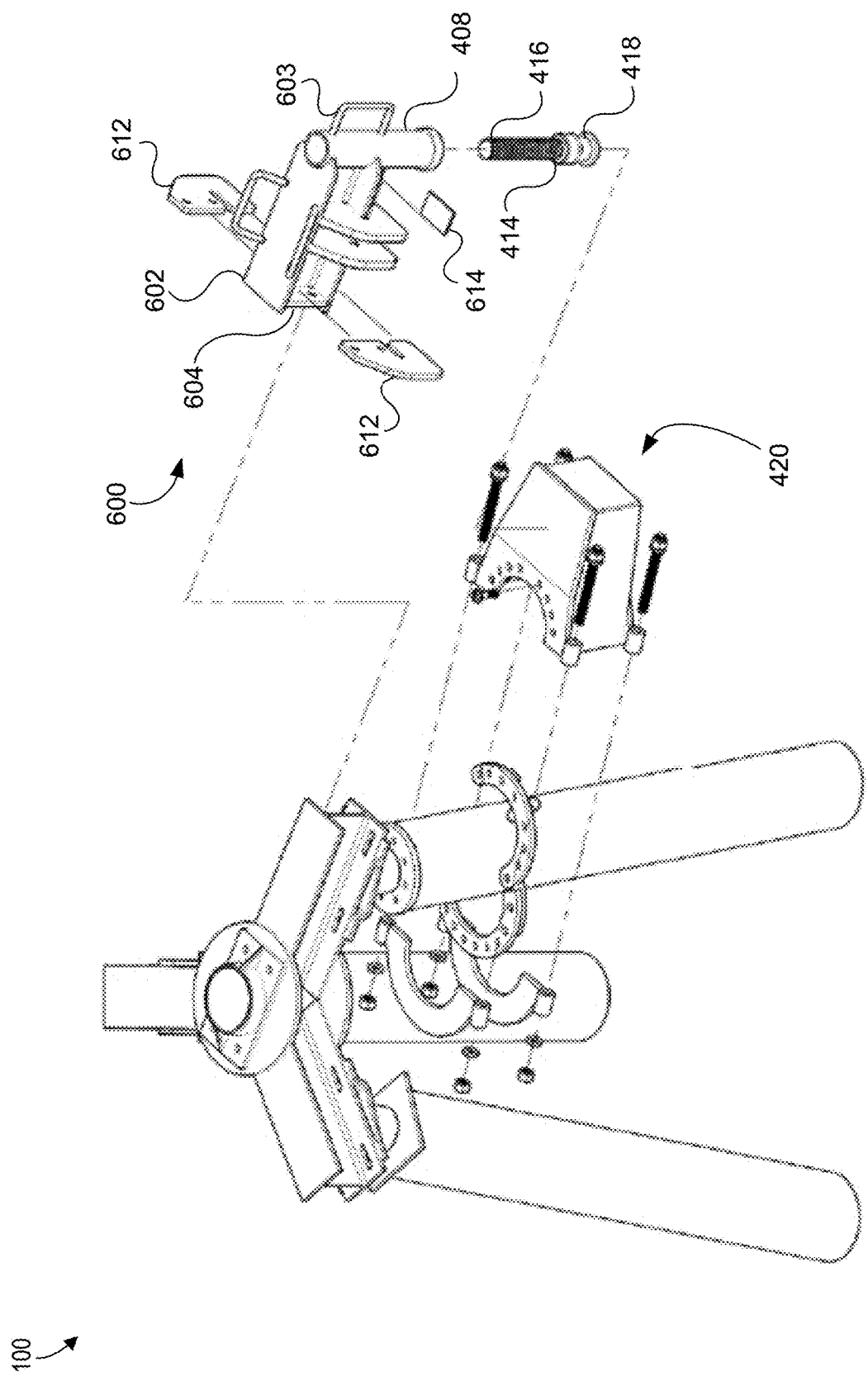
FIG. 6B is a partially exploded perspective view of a transmission tower tripod and large pile configuration having an attached screw jack lifting beam assembly and pile bearing platform assembly, according to an example implementation.

According to some embodiments, aspects of the present disclosure may be used to replace a decaying pile adapter 112 on a transmission tower base 100 having a tripod 102 that has not been reinforced with boomerangs by using a screw jack lifting beam assembly in a manner similar to that described above with respect to FIGS. 4A-5B. FIG. 6A shows an embodiment of a transmission tower tripod 102 and large pile 110 configuration having an attached screw jack lifting beam assembly 600 and pile bearing platform assembly 420 with a detailed view shown in inset 620. As shown in FIG. 6B, the screw jack lifting beam assembly 600 may operate in a manner similar to the modified screw jack lifting beam assembly 400 by attaching to a tripod arm 103 and transferring the load of the tower to a pile bearing platform assembly attached to large pile 110. The screw jack lifting beam assembly 600 may be capable of lifting and holding a loaded tripod arm 103 of the tripod 102 and may provide a temporary load path to bypass the existing pile bracket. Similar to the modified screw jack lifting beam assembly 400, the screw jack lifting beam assembly 600 may include a screw jack body 602, a threaded chamber 408 (e.g., an Acme threaded chamber), and a screw and cap assembly 414. In some embodiments, the screw jack body 602 may be configured to slide onto and directly engage the top plate 106 of a tripod arm 103. For example, the portion of screw jack body 602 may include a slot formed between the stiffener brackets of the screw jack body 602 and an underside of the screw jack body 602 that are configured to snuggly receive the top plate 106 and a portion of the tripod web 104 of a tripod arm 103, upon sliding onto the tripod arm 103. The screw jack lifting beam assembly 600 may include a safety chain (not pictured) that may serve to restrain the screw jack body 402 to the tripod arm 103 and prevent it from walking or sliding. For example, a safety chain may be inserted through the handle 603 of the screw jack body 602, wrapped around the existing tripod 102 and with the two ends of the safety chains attached to one another with a shackle. The screw jack body 602 may work in conjunction with the screw and cap assembly 414 to carry all of the load at the end of a given tripod arm 103. According to some embodiments, the front face 604 of the screw jack lifting beam assembly 600 may be configured receive a portion of the top plate 106 and/or the tripod web 104 of a tripod arm 103 such that the screw jack lifting beam assembly 600 may slide onto the tripod arm 103. Removable stiffener brackets 612 may be attached to the screw jack body 602 (e.g., via being bolted together) to provide additional stability by providing a slot that may receive a portion of one half of the top plate 106 of the tripod arm 103. In some embodiments, the screw jack lifting beam assembly 600 may include steel shim plates 614 that may be used as needed below the top plate 106 of a tripod arm 103 at contact points of the screw jack body 602. According to some embodiments, steel shim plates 614 may be used to make the screw jack lifting beam assembly 600 fit more snuggly in place once it is slid into final position onto the tripod arm 103. Once the screw jack lifting beam assembly 600 and pile bearing platform assembly 420 are attached, a decaying pile adapter and bracket may be removed and a new two-piece pile adapter 450 and bracket 470 may be installed in a manner similar to that described above with respect to FIGS. 5A-B.

Figure 7:
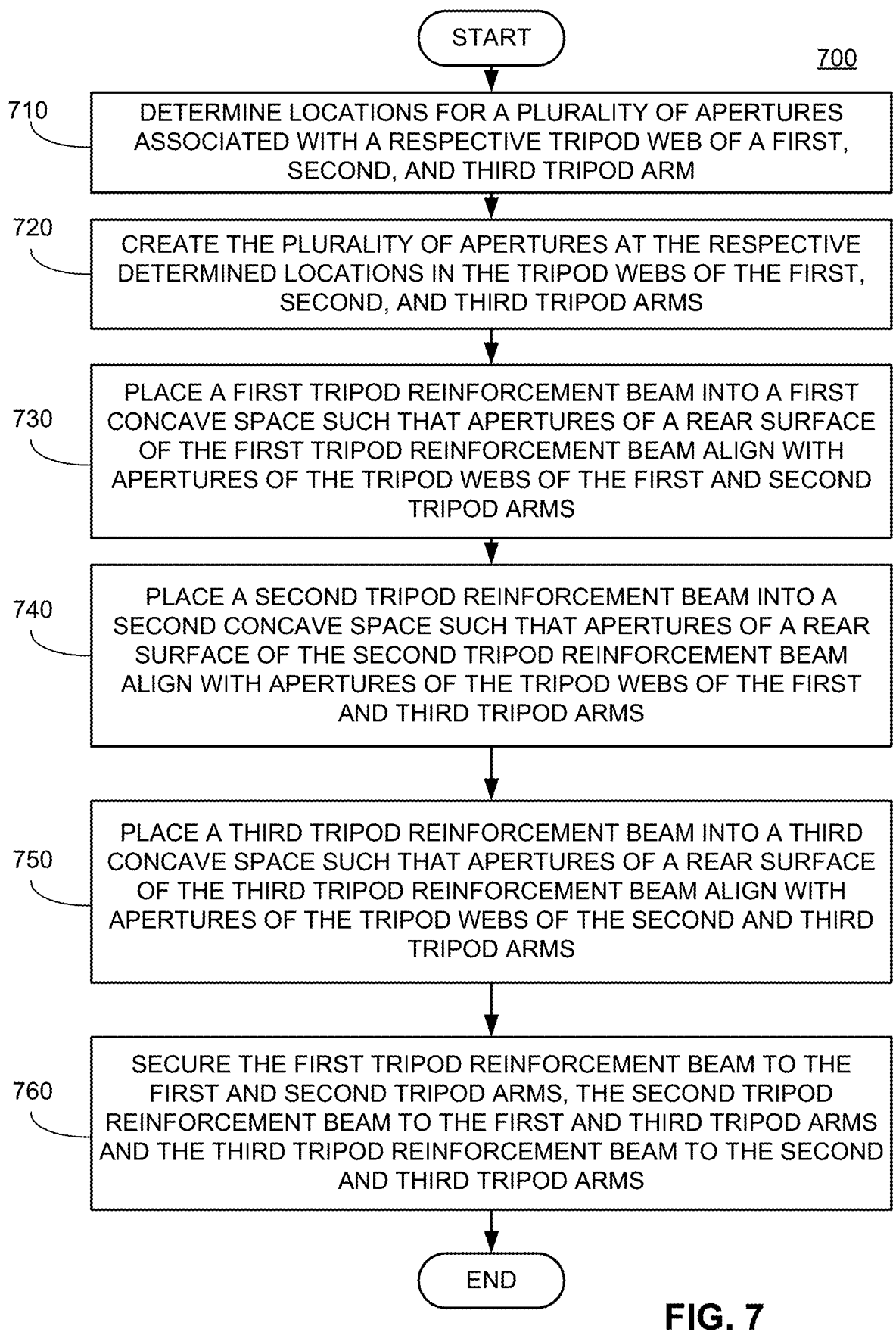
FIG. 7 is a flow diagram of a method 700, according to an example implementation.

FIG. 7 is a flow diagram of a method 700, according to an example implementation. As shown in FIG. 7, in some implementations, the method can include, at 710, determining locations for a plurality of apertures associated with a respective tripod web 104 of a first, second and third tripod arm 103a,b,c. According to some embodiments, determining locations for a plurality of apertures associated with the tripod web 104 of the first tripod arm 103a can include placing the first tripod reinforcement beam 300a into the first concave space 202a such that a portion of the rear face 302 (or rear surface) of the first tripod reinforcement beam 300a abuts the tripod web 104 of the first tripod arm 103a and marking a surface of the tripod web 104 of the first tripod arm 103a at locations that align with one or more apertures 324 of the portion of the rear face 302 of the first tripod reinforcement beam 300a. A surface may be marked by, for example, drawing a mark using a marker, paint, or other such instrument, or by creating an indention in the surface with a punch. According to some embodiments, prior to placing the first tripod reinforcement beam 300a into the first concave space 202a, securing members (e.g., bolts, screws, fasteners, or the like) that connect an upper securing member, such as flower pot socket 122, to the top plates 106 of the first tripod arm 103a and the second tripod arm 103b to remove obstructions in the first concave space 202a to allow insertion of the first tripod reinforcement beam 300a. In some embodiments, the method may include creating one or more apertures in the top face 304 of the first tripod reinforcement beam 300a that align with apertures in the upper securing member and the top plates 106 of the first tripod arm 103a and second tripod arm 103b when the first tripod reinforcement beam 300a is centrally positioned in the first concave space 202a. Alternatively, the method may include marking locations on the top face 304 that correspond to such apertures of the upper securing member and the respective top plates 106 so that apertures may be created in the top face 304 following a removal of the first tripod beam 300a from the first concave space 202a. In some embodiments, apertures may similarly be created in the bottom face 306 of the first tripod beam 300a following removal of one or more securing members that connect a bracket (e.g., bracket 114) to the bottom plates 306 of the first tripod arm 103a and the second tripod arm 103b to remove obstructions from the first concave space 202a to allow insertion of the first tripod beam 300a. In a later step when the first tripod reinforcement beam 300a is attached and/or secured to the tripod 102, securing members such as bolts, screws or the like, may be inserted through the rear surface apertures 324 of the first tripod reinforcement beam 300a to attach the first tripod reinforcement beam 300a to the tripod webs 104 of the first tripod arm 103a and the second tripod arm 103b. Likewise, securing members may be inserted through apertures in the top face 304 of the first tripod reinforcement beam 300a to attach the first tripod reinforcement beam 300a to the upper securing member (e.g., flower pot socket 122) and the top plates 106 of the first tripod arm 103a and the second tripod arm 103b, and securing members may be inserted through apertures in the bottom face 306 of the first tripod reinforcement beam 300a to attach the first tripod reinforcement beam 300a to the bottom plates 108 of the first tripod arm 103a and the second tripod arm 103b and/or one or more lower support members or connected portions, such as brackets (e.g., brackets 114). This process may be repeated for the second and third tripod reinforcement beams 300b,c with respect to the other two concave spaces 202b,c of the tripod 102, such that all three tripod beams 300a,b,c may have the appropriate apertures to allow attachment to the respective tripod arms 103a,b,c, upper securing member and/or lower support members.

At 720, the method can include creating the plurality of apertures at the respective determined locations in the tripod webs 104 of the first, second and third tripod arms 103a,b,c. As will be appreciated by those of skill in the art, apertures may be created by drilling, punching, or cutting through a surface. According to some embodiments, the method may include determining locations for new apertures to be made in a rear face 302 of a tripod reinforcement beam 300 based on currently existing rear surface apertures 324 of another tripod reinforcement beam 300 or web 104 apertures of another tripod arm 103. For example, in some embodiments, each tripod reinforcement beam 300 may initially have a first plurality of rear surface apertures 324 in the first substantially planar rear face portion 312, but may only have a single rear surface aperture 324 in the second substantially planar rear face portion 314. In some embodiments, the determined locations for a plurality of apertures associated with a tripod web 104 of a first tripod arm 103a may be determined based on the alignment of the first plurality of rear surface apertures 324 of a first tripod reinforcement beam 300a when the first tripod reinforcement beam 300a is positioned in the first concave space 202a. The second tripod reinforcement beam 300b may then be positioned in the second concave space 202b such that the second substantially planar rear face 314 of the second tripod reinforcement beam 300b abuts the other side of the tripod web 104 of the first tripod arm 103a opposite the first substantially planar rear face portion 312 of the first tripod reinforcement beam 300a. In some embodiments, a first aperture of the tripod web 104 corresponding to a location of the single rear surface aperture 324 in the second substantially planar rear face portion 314 of the second tripod reinforcement beam 300b may be created by drilling, punching, or cutting the aperture at either a corresponding marked location on the tripod web 104 or by positioning the second tripod reinforcement beam 300b centrally in the second concave space 202b and making a hole in the tripod web 104 of the first tripod arm 103a that aligns with the single rear surface aperture 324. The second tripod reinforcement beam 300b may then be affixed to the tripod web 104 of the first tripod arm 103a by aligning the single rear surface aperture 324 of the second tripod reinforcement beam 300b with the aperture of the tripod web 104 and inserting a securing member (e.g., a bolt, screw, fastener or the like) between the aligned apertures. According to some embodiments, once the second tripod reinforcement beam 300b is attached to the tripod web 104 of the first tripod arm 103a via the single rear surface aperture 324, a plurality of apertures may be created nearly simultaneously in the tripod web 104 and the second substantially planar rear face portion 316 of the second tripod reinforcement beam 300b by, for example, drilling, punching or cutting through both the tripod web 104 and the second substantially planar rear face portion 314 of the second tripod reinforcement beam 300b at the locations that were previously marked on the tripod web 104 to align with the first substantially planar rear face portion 312 of the first tripod reinforcement beam 300a. Alternatively, the apertures may be created in the tripod 104 and the second tripod reinforcement beam 300b successively instead of nearly simultaneously by first creating the apertures in the tripod web when the second tripod reinforcement beam 300b is detached from the tripod 102 and then attaching the second tripod reinforcement beam 300b to the tripod web 104 of the first tripod arm 103a via the single rear surface aperture 324 as described above, and then inserting a hole-making device (such as a drill, a punch, a cutting tool, or the like) through the apertures of the tripod web 104 of the first tripod arm 103a and through the rear surface 302 of the second tripod reinforcement beam 300b to create corresponding apertures 324 in the second tripod reinforcement beam 300b. According to some embodiments, either of these processes may be repeated to create new apertures in the second substantially planar rear face portions 314 of the first and third tripod reinforcement beams 300a,c to ensure the ultimate alignment of the apertures of three tripod reinforcement beams 300a,b,c with one another and the respective tripod webs 104 during final installment of the tripod reinforcement beams 300a,b,c.

According to some embodiments, after first, second, and third tripod reinforcement beams 300a,b,c, the tripod webs 104 of the first, second, and third tripod arms 103a,b,c, and an upper securing member (e.g., flower pot socket 122) or lower support members (e.g., bracket 470 have had the appropriate apertures created in them, the tripod 102 may be cleaned and otherwise prepared prior to final installation of the first, second, and third tripod reinforcement beams 300a,b,c. For example, in some embodiments, the tripod 102 may be cleaned with a solvent, the surface of the tripod 102 may be prepared by hand or power tool cleaning, and the tripod 102 may be coated with one or more corrosion inhibiting coats, paints, pastes, wraps and/or mastics. Similarly, according to some embodiments, following installation of the first, second, and third tripod reinforcement beams 300a,b,c to the tripod 102, a protective coating, paint, paste, wrap, sealant and/or mastic may be installed on the seams and/or joints common to existing tripod 102 structure and the newly installed tripod reinforcement beams 300a,b,c structure to prevent, inhibit and/or mitigate future corrosion.

At 730, the method can include placing a first tripod reinforcement beam 300a into a first concave space 202a formed by a first side of the first tripod arm 103a and a first side of the second tripod arm 103b such that apertures 324 of a rear surface 302 of the first tripod reinforcement beam 300a align with apertures of the tripod webs 104 of the first and second tripod arms 103a,b. According to some embodiments, a tripod reinforcement beam 300 may be secured in a concave space 202 by, for example, clamping the tripod reinforcement beam 300 to a portion of the tripod 102.

At 740, the method can include placing a second tripod reinforcement beam 300b into a second concave space 202b formed by a second side of the first tripod arm 103a and a first side of the third tripod arm 103c such that apertures 324 of a rear surface of the second tripod reinforcement beam 300b align with apertures of the tripod webs 104 of the first and third tripod arms 103a,c.

At 750, the method can include placing a third tripod reinforcement beam 300c into a third concave space 202c formed by a second side of the second tripod arm 103b and a second side of the third tripod arm 103c such that apertures 324 of a rear surface of the third tripod reinforcement beam 300c align with apertures of the tripod webs 104 of the second and third tripod arms 103b,c.

At 760, the method can include securing the first tripod reinforcement beam 300a to the first and second tripod arms 103a,b, the second tripod reinforcement beam 300b to the first and third tripod arms 103a,c and the third tripod reinforcement beam 300b to the second and third tripod arms 103b,c. As previously described above, a tripod reinforcement beam 300 may be secured to portions of two tripod arms 103 by aligning apertures 324 of the tripod reinforcement beam 300 with apertures of the respective tripod webs and inserting securing members, such as bolts, screws, fasteners, or the like through the aligned apertures. According to some embodiments, all three tripod arms 103a,b,c may be positioned in their respective concave spaces 202a,b,c prior to being secured by securing members, so that the apertures 324 of two tripod reinforcement beams 300 on either side of a given tripod web 104 may be aligned to allow a securing member to secure both reinforcement beams 300 to the tripod web 104.

It will be understood that the various steps of any of the methods described herein are illustrative only, and that steps may be removed, other steps may be used, or the order of steps may be modified.

Certain embodiments of the disclosed technology are described above with reference to flow diagrams of systems and methods according to example embodiments of the disclosed technology. It will be understood that some blocks of the flow diagrams may not necessarily need to be performed in the order presented, or may not necessarily need to be performed at all, according to some embodiments of the disclosed technology.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A tripod reinforcement beam comprising a body defined by:
   a top face comprising a substantially planar top surface;
   a bottom face comprising a substantially planar bottom surface that is substantially parallel to the top face, the bottom face comprising a shape substantially similar to the top face and being aligned beneath the top face;

a rear face disposed substantially perpendicularly between a rear edge of the top face and a rear edge of the bottom face, the rear face comprising:
a first substantially planar rear face portion;
a second substantially planar rear face portion; and
an angled rear face portion that is disposed between the first substantially planar rear face portion and the second substantially planar rear face portion such that the first substantially planar rear face portion is oriented at an angle relative to the second substantially planar rear face portion; and
a front face disposed between a front edge of the top face and a front edge of the bottom face, the front face comprising:
a first substantially planar front face portion that is oriented parallel to the first substantially planar rear face portion; and
a second substantially planar front face portion that is oriented parallel to the second substantially planar rear face portion.

2. The tripod reinforcement beam of claim 1, wherein the angle is approximately 120 degrees.

3. The tripod reinforcement beam of claim 1, wherein the first substantially planar rear face portion, the second substantially planar rear face portion and the angled rear face portion comprise a continuous rear plate.

4. The tripod reinforcement beam of claim 3, wherein the first substantially planar front face portion comprises a first front plate and the second substantially planar front face portion comprises a second front plate.

5. The tripod reinforcement beam of claim 4, wherein the body is hollow, and the front face further comprises an angled front face portion disposed between the first front plate and the second front plate, the angled front face portion comprising a void providing access to an internal space of the body.

6. The tripod reinforcement beam of claim 5, wherein the first substantially planar rear face portion comprises one or more first rear apertures and the second substantially planar rear portion comprises one or more second rear apertures.

7. The tripod reinforcement beam of claim 6, wherein the first front plate comprises one or more first front apertures and the second front plate comprises one or more second front apertures.

8. The tripod reinforcement beam of claim 7, wherein the one or more first rear apertures are aligned with the one or more first front apertures.

9. The tripod reinforcement beam of claim 7, wherein the body forms a single contiguous piece.

10. A transmission tower base with a reinforced tripod comprising:
a first, second, and third tripod arm each positioned to extend away from a central point such that each adjacent pair of tripod arms forms an approximately 120-degree angle, each of the first, second and third tripod arms respectively comprising:
a top plate;
a bottom plate positioned in parallel to the top plate; and
a tripod web comprising a substantially planar plate joining the top plate and the bottom plate at a substantially central axis of the top plate and the bottom plate, the tripod web having a first side and a second side;
an upper securing member positioned on top of the top plates of each of the first, second, and third tripod arms about the central point;

three lower support members, each lower support member being positioned beneath the bottom plate of a respective one of the first, second, and third tripod arms;
a first tripod reinforcement beam secured to the first tripod arm and the second tripod arm;
a second tripod reinforcement beam secured to the first tripod arm and the third tripod arm; and
a third tripod reinforcement beam secured to second tripod arm and the third tripod arm.

11. The transmission tower base with a reinforced tripod of claim 10, wherein the first tripod reinforcement beam comprises:
a rear surface secured to the first side of the tripod web of the first tripod arm and the first side of the tripod web of the second tripod arm;
a top surface secured to the top plate of the first tripod arm and the top plate of the second tripod arm; and
a bottom surface secured to the bottom plate of the first tripod arm and the bottom plate of the second tripod arm.

12. The transmission tower base with a reinforced tripod of claim 10, wherein the upper securing member is secured to the one or more tripod reinforcement beams.

13. The transmission tower base with a reinforced tripod of claim 10, wherein a lower support member of the three lower support members is secured to one of the three tripod members.

14. The transmission tower base with a reinforced tripod of claim 10, wherein:
a first portion of a first tripod reinforcement beam is bolted to the tripod web of the first tripod arm and a first portion of a second tripod reinforcement beam; and
a second portion of the first tripod reinforcement beam is bolted to the tripod web of the second tripod arm and a first portion of a third tripod beam.

15. The transmission tower base with a reinforced tripod of claim 14, wherein a second portion of the second tripod reinforcement beam is bolted to the tripod web of the third tripod arm and a second portion of the third tripod beam.

16. The transmission tower base with a reinforced tripod of claim 10, wherein one or more seams between the first, second, and third tripod reinforcement beams and the first, second, and third tripod arms are coated with protective coating or sealant.

17. A method of reinforcing a tripod with a tripod reinforcement beam comprising:
determining locations for a plurality of apertures associated with a respective tripod web of a first, second and third tripod arm;
creating the plurality of apertures at the respective determined locations in the tripod webs of the first, second and third tripod arms;
placing a first tripod reinforcement beam into a first concave space formed by a first side of the first tripod arm and a first side of the second tripod arm such that apertures of a rear surface of the first tripod reinforcement beam align with apertures of the tripod webs of the first and second tripod arms;
placing a second tripod reinforcement beam into a second concave space formed by a second side of the first tripod arm and a first side of the third tripod arm such that apertures of a rear surface of the second tripod reinforcement beam align with apertures of the tripod webs of the first and third tripod arms;
placing a third tripod reinforcement beam into a third concave space formed by a second side of the second tripod arm and a second side of the third tripod arm such that apertures of a rear surface of the third tripod reinforcement beam align with apertures of the tripod webs of the second and third tripod arms; and securing the first tripod reinforcement beam to the first and second tripod arms, the second tripod reinforcement beam to the first and third tripod arms and the third tripod reinforcement beam to the second and third tripod arms.

18. The method of claim 17, where determining locations for a plurality of apertures associated with the tripod web of the first tripod arm comprises:

placing the first tripod reinforcement beam into the first concave space such that a portion of the rear surface of the first tripod reinforcement beam abuts the tripod web of the first tripod arm; and marking a surface of the tripod web of the first tripod arm at locations that align with one or more apertures of the portion of the rear surface of the first tripod reinforcement beam.

19. The method of claim 18, further comprising creating one or more apertures in a portion of the rear surface of the second tripod reinforcement beam by:

placing the second tripod reinforcement beam into the second concave space such that the portion of the rear surface of the second tripod reinforcement beam abuts the tripod web of the first tripod arm; and inserting hole-making device through the apertures of the tripod web of the first tripod arm and through the rear surface of the second tripod reinforcement beam.

20. The method of claim 17, further comprising coating one or more seams of the first, second, and third tripod reinforcement beams and the first, second, and third tripod arms with a protective coating or sealant.

* * * * *